United States Patent
Dirk

(10) Patent No.: US 7,663,739 B2
(45) Date of Patent: Feb. 16, 2010

(54) CUSTOMIZABLE SPECTRAL PROFILES FOR FILTERING

(75) Inventor: Carl W. Dirk, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 1290 days.

(21) Appl. No.: 10/688,200

(22) Filed: Oct. 17, 2003

(65) Prior Publication Data
US 2004/0125607 A1    Jul. 1, 2004

Related U.S. Application Data

(60) Provisional application No. 60/419,491, filed on Oct. 18, 2002.

(51) Int. Cl.
*G01N 21/00* (2006.01)
(52) U.S. Cl. ............... 356/72; 356/73; 356/303; 702/40; 362/231
(58) Field of Classification Search ........... 356/72, 356/73; 382/165, 164, 167; 702/40; 362/231
See application file for complete search history.

(56) References Cited

U.S. PATENT DOCUMENTS

| 5,173,808 | A | 12/1992 | Auer et al. ............... 359/722 |
| 5,267,061 | A | 11/1993 | Ansley et al. ............. 359/15 |
| 5,786,591 | A | 7/1998 | Asahi .................... 250/226 |
| 6,031,653 | A | 2/2000 | Wang .................... 359/247 |
| 6,075,872 | A | 6/2000 | McGuire ................. 382/100 |
| 6,154,708 | A | 11/2000 | Koachi ................... 702/40 |
| 7,387,405 | B2* | 6/2008 | Ducharme et al. ........ 362/231 |
| 2002/0012461 | A1 | 1/2002 | MacKinnon et al. ...... 382/164 |
| 2004/0105261 | A1 | 6/2004 | Ducharme et al. ........ 362/231 |

FOREIGN PATENT DOCUMENTS

| EP | 1 122 588 | 8/2001 |
| WO | WO 92/01557 | 2/1992 |
| WO | WO 94/14089 | 6/1994 |
| WO | WO 96/10211 | 4/1996 |
| WO | WO 01/36864 | 5/2001 |
| WO | WO 01/46617 | 6/2001 |
| WO | WO 02/63206 | 2/2002 |
| WO | WO 2004/036161 | 4/2004 |

OTHER PUBLICATIONS

Piegari, "Ultraviolet, visible and infrared performance of coated glass for museums," *Optical and Infrared Thin Films*, 4094:74-82, 2000.
Weintraub, "The color of white: is there a 'preferred' color temperature for the exhibition of works of art?" *WAAC Newsletter*, 21(3):1-6, 2000.

* cited by examiner

*Primary Examiner*—L. G Lauchman
(74) *Attorney, Agent, or Firm*—Fulbright & Jaworski

(57) ABSTRACT

Methods for generating a customized spectral profile, which can be used to generate a corresponding filter. A trial source spectrum is generated. An uncorrected lamp source spectrum is determined. One or more optical indices are calculated using the trial source spectrum or the uncorrected lamp source spectrum, and one or more of the optical indices are optimized by varying the trial source spectrum to generate the customized spectral profile.

25 Claims, 23 Drawing Sheets

$WR = \%$ lamp power through filter $= 100*(L1_R - T_{n,R})/L1_R$

FIG. 8

CUSTOMIZABLE SPECTRAL PROFILES FOR FILTERING

This application claims priority to U.S. Provisional Patent Application Ser. No. 60/419,491 (the '491 Application), which was filed on Oct. 18, 2002. The '491 Application, including its Appendix A, is incorporated by reference.

BACKGROUND OF THE INVENTION

1. Field of the Invention

The present invention relates generally to optics and spectroscopy. More particularly, the present invention relates to techniques for generating customized spectral profiles, which can be used to generate corresponding optical filters. Representative embodiments relate to spectral profiles that may be used to generate optical filters that (a) protect works of art, (b) aesthetically render objects, and/or (c) correct the rendering of an object.

2. Background

It is known that the quality of light falling upon a work of art affects the degree to which that work of art will be damaged through photochemical processes. Photodamage of works of art, in turn, is an important concern not only for the financial well-being of museums, but also for the preservation of this and foreign cultures.

One of the most common methods to minimize photodamage is to minimize the amount of ultraviolet and/or infrared radiation that impacts artwork. Although this method may be somewhat effective, it unfortunately does not prevent damage to the artwork imposed by photons that do not significantly affect the color rendering of that artwork. In other words, today's solutions do not block visible-light photons that do not contribute to the visualization of the object. Put yet another way, today's solution are not equipped to render only photometric light—transmit visible-light photons that significantly affect the visualization of a particular object (e.g., light necessary for proper color rendering) while blocking photons unneeded for this task.

It is also known that the quality of light falling upon a work of art affects the aesthetics of that art. For instance, illumination by candlelight may give a work of art a different "look and feel" than when the art is illuminated by fluorescent lighting. While the underlying physical reasons for this difference are relatively complex, the fact remains that existing technology is ill-equipped at creating customizable filters for aesthetically rendering an object. In particular, today's technology does not afford museums the opportunity to easily select different filters that may be used to simulate, for instance, candlelight, torchlight, oil lamp lighting, sunlight, roomlight, mantle-light, gas light, etc. Further, today's technology does not afford museums the opportunity to create such filters customized for a particular piece of art. Accordingly, many times, museum patrons cannot fully appreciate the way in which the artist himself or herself saw a particular work of art as it was being painted.

Finally, it is known that, in certain situations, the rendering of artwork by existing illumination may be degraded for one or more reasons. For instance, if a painting is damaged or particularly faded in one or more regions, existing illumination may do nothing to correct for the problem. Further, if a viewer is suffering from a form of vision loss, one or more colors of a work of art may be diminished or otherwise effected relative to other colors. A common form of vision loss in adults is that the perception of blue light fades due to yellowing of the lens of the eye. Unfortunately, today's technology does not provide solutions to these types of problems.

These issues highlight problems existing in today's technology but are not meant to constitute an exhaustive list. Rather, they show that there is an important need for the techniques of this disclosure, which address concerns mentioned above.

SUMMARY OF THE INVENTION

Shortcomings of the prior art are reduced or eliminated by the techniques discussed in this disclosure. In illustrative embodiments, customized spectral profiles are created that can be used to generate corresponding optical filters. In different embodiments, the spectral profiles may be customized for a particular object, such as a work of art. Profiles and corresponding filters can be made that (a) protect an object from photodamage, (b) aesthetically render an object, and/or (c) correct the rendering of an object. Exemplary filters protect works of art while, at the same time, rendering them as if illuminated by candlelight, torchlight, oil lamp lighting, sunlight, roomlight, mantle-light, gas light, etc.

In one respect, the invention involves a method for generating a customized spectral profile. A trial source spectrum is generated. An uncorrected lamp source spectrum is determined. One or more optical indices are calculated using the trial source spectrum or the uncorrected lamp source spectrum, and one or more of the optical indices are optimized by varying the trial source spectrum to generate the customized spectral profile.

The method may also include calculating a corrected lamp source spectrum using the uncorrected lamp source spectrum, and the optical indices may be calculated using the trial source spectrum, the uncorrected lamp source spectrum, or the corrected lamp source spectrum. The optical indices may include one or more of chromaticity, filter efficiency, lumens per watt efficiency, overall filter efficiency, watt reduction criteria, color rendering index, and modified color rendering index. One or more of the optical indices may correspond to a specific object to be illuminated. That specific object may include a work of art. The optimization process may include varying the trial source spectrum by changing one or more parameters of contributing functions of the trial source spectrum or changing individual values of the trial source spectrum at different wavelengths.

The customized spectral profile may include a spectral profile for protecting an object from photodamage. In this regard, the spectral profile may render only photometric light.

The customized spectral profile may include a spectral profile for aesthetically rendering an object. In this regard, the spectral profile may include a candlelight profile for rendering the object as if illuminated by candlelight. It may include a torchlight profile for rendering the object as if illuminated by torchlight. It may include a fluorescent profile for rendering the object as if illuminated by fluorescent lighting. It may include an incandescent profile for rendering the object as if illuminated by an incandescent light. It may include a halogen profile for rendering the object as if illuminated by halogen-based lighting. It may include an oil lamp profile for rendering the object as if illuminated by an oil lamp. It may include a daylight profile for rendering the object as if illuminated by sunlight. It may include a roomlight profile for rendering the object as if illuminated by sunlight or candlelight scattered in a room. It may include a gas light profile for rendering the object as if illuminated by a gas light. It may include a lime light profile for rendering the object as if illuminated by a lime light. It may include a mantle-light profile for rendering the object as if illuminated by a Welsbach mantle. It may include an emphasis profile for emphasizing one or more colors of the object.

The customized spectral profile may include a spectral profile for correcting the rendering an object. In this regard, the spectral profile may include a profile for correcting the rendering of an object for an eye experiencing loss of vision with respect to one or more colors.

In another respect, the invention involves a method for generating an optical filter. An optical filter is generated from a customized spectral profile, and the customized spectral profile is generated by optimizing one or more optical indices by varying a trial source spectrum. The optical indices are calculated using the trial source spectrum or an uncorrected lamp source spectrum.

In another respect, the invention involves computer-readable media including instructions for: generating a trial source spectrum; determining an uncorrected lamp source spectrum; calculating one or more optical indices using the trial source spectrum or the uncorrected lamp source spectrum; and optimizing one or more of the optical indices by varying the trial source spectrum to generate the customized spectral profile.

In another respect, the invention involves an optical filter generated from a customized spectral profile. The customized spectral profile is generated by optimizing one or more optical indices by varying a trial source spectrum, and the optical indices are calculated using the trial source spectrum or an uncorrected lamp source spectrum.

In another respect, the invention involves an optical filter including means for exhibiting one or more optical indices optimized by varying a trial source spectrum. The optical indices are calculated using the trial source spectrum or an uncorrected lamp source spectrum.

In another respect, the invention involves an optical filter including means for rendering an object with only photometric light.

In another respect, the invention involves an optical filter including means for rendering an object as if illuminated by candlelight.

In another respect, the invention involves a customized spectral profile including a trial source spectrum having characteristics that optimize one or more optical indices that are calculated using the trial source spectrum or an uncorrected lamp source spectrum.

As used herein, "a" and "an" shall not be interpreted as meaning "one" unless the context of the invention necessarily and absolutely requires such interpretation.

Other features and associated advantages will become apparent with reference to the following detailed description of specific embodiments in connection with the accompanying drawings.

BRIEF DESCRIPTION OF THE DRAWINGS

The techniques of this disclosure may be better understood by reference to one or more of these drawings in combination with the detailed description of illustrative embodiments presented herein. Identical reference numbers signify identical or similar elements.

FIG. 8 is a schematic diagram of aspects of generating a customized spectral profile in accordance with embodiments of the present disclosure. A watt reduction criteria is calculated.

DESCRIPTION OF ILLUSTRATIVE EMBODIMENTS

Figure 1:
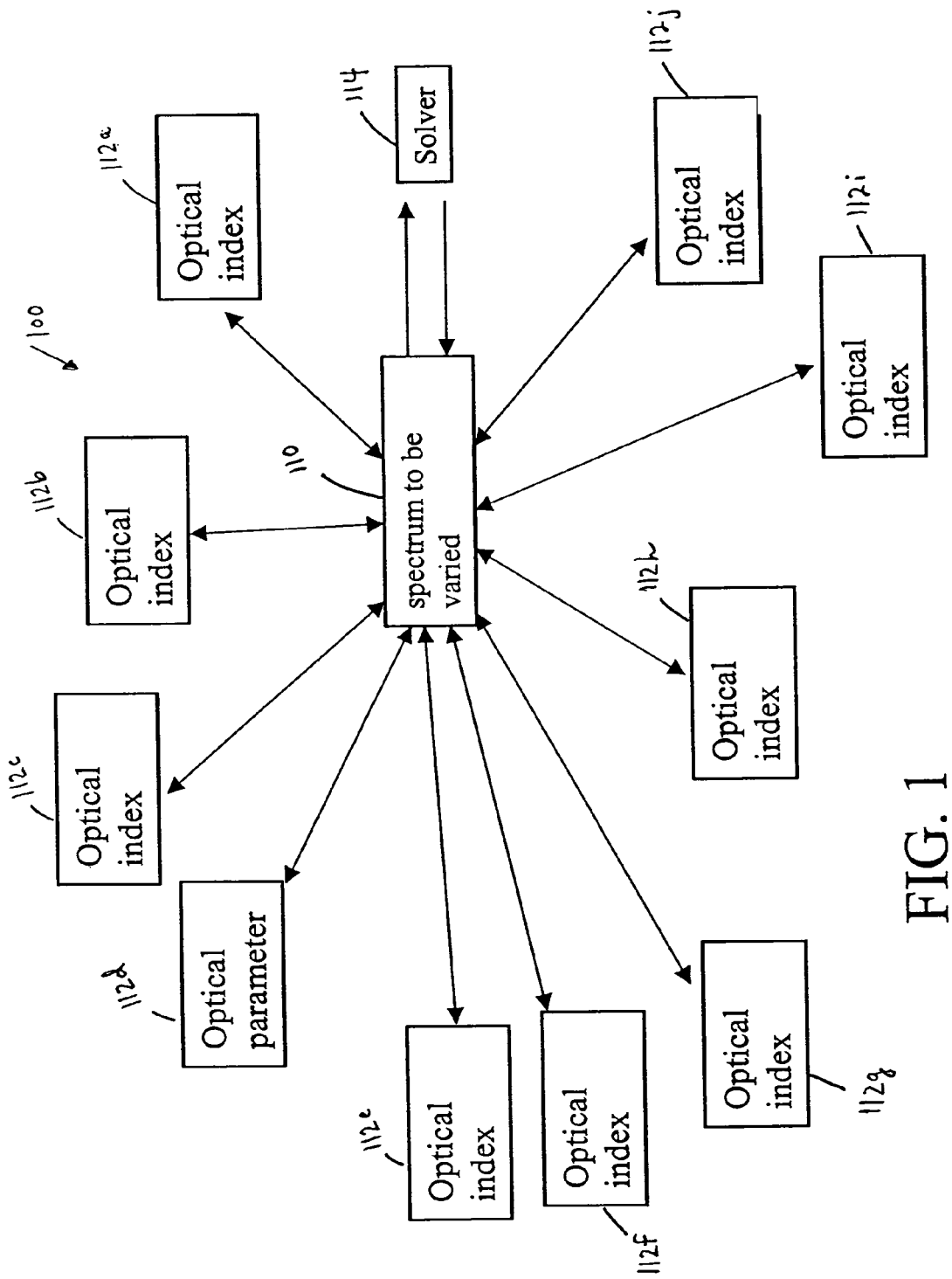
FIG. 1 is a general schematic diagram of a method for generating a customized spectral profile in accordance with embodiments of the present disclosure.

In general, the present invention provides techniques for generating customized spectral profiles, which can be used to generate corresponding optical filters. Representative embodiments relate to spectral profiles that may be used to generate optical filters that (a) protect objects such as works of art, (b) aesthetically render objects, and/or (c) correct the rendering of an object. Other uses of the spectral profiles will be apparent to those of ordinary skill in the art, having the benefit of this disclosure.

Custom spectral profiles may be created according to a particular visualization application. Once the custom spectral profile is created, a corresponding filter can be built to realize that spectral profile. Different visualization applications have different requirements. For instance, if a goal is to protect works of art from light damage, one may require a filter that (a) blocks unnecessary photons (photons that do not affect the visualization or color rendering of the art) while (b) allowing a quantity of photons that do affect visualization to pass through the filter. In other words, a goal may be to transmit photometric light while blocking other light. If a goal is to render art as it would look under candlelight or a different type of illumination, one requires a filter that blocks particular photons so that the light passing through the filter has the quality of candlelight or the other type of lighting being simulated. Similarly, if a goal is to render a piece of art so that the red or blue light quality is enhanced or softened, a corresponding filter would be required.

For all these applications, the corresponding spectral profile (to be generated) may depend on the qualities of the object being illuminated. For instance, one spectral profile may be suitable to block unnecessary photons for object A but not for object B (since object A and object B may comprise very different color schemes, textures, etc.).

An exemplary general embodiment of the present invention involves the following: (a) defining a set of optical indices (generalized or for a particular object) to be optimized; (b) generating a custom spectral profile meeting the optimization requirements, for a given illumination source; and (c) generating a filter according to the spectral profile. In an exemplary embodiment, step (b) may entail (i) determining wavelength regions to be filtered from the illumination source; and (ii) determining the degree of filtration for those wavelength regions.

Having the ability to generate customized spectral profiles and filters leads to great advantages. First, one may create profiles and filters that protect works of art and other objects from damage resulting from photochemical processes. This protection may stem from the blocking of all (or a significant portion of) non-photometric light. Second, one may create profiles and filters than affect the aesthetics of works of art and other objects. For instance, illumination by candlelight, torchlight, oil lamp lighting, sunlight, roomlight, mantlelight, gas light, etc. may be simulated. At the same time, this aesthetic quality of light may be afforded while protecting the object from photochemical degradation. Third, one may create profiles and filters that correct for problems in rendering objects such as, but not limited to, problems stemming from vision loss and problems stemming from damaged objects. With the benefit of the present disclosure, all of these profiles and filters may be custom-made for one particular object. For instance, a candlelight filter that also protects against damage may be custom-made for a particular painting, taking into account the particular color scheme of that painting.

For museum applications, it is contemplated that each piece of art may be fitted with its own custom protective and/or aesthetic and/or corrective filter. As will be recognized by those having skill in the art, this provides for great advantages including, but not limited to, financial benefits resulting from works of art "lasting" longer before restoration work is needed. Alternatively, more general filters can be made to achieve the same or similar purposes—such filters would not be specifically tailored for one particular object.

FIGS. 1-11 illustrate representative, but non-limiting, embodiments of the present disclosure. Turning first to FIG. 1, a generalized schematic diagram of a method 100 for generating a customized spectral profile is shown. Included are a spectrum to be varied 110, a solver 114, and a plurality of optical indices 112$a$-$j$.

The method of FIG. 1 operates as follows. Spectrum 110 is a light spectrum generated by the practitioner or another. It, along with other parameters such as source illumination parameters and object parameters of the object being illuminated, may be used to calculate one or more optical indices 112. The different optical indices 112 generally represent quantities or properties that the practitioner wants to optimize, or generally control, in order to achieve a desired filter or a desired filter characteristic. Depending on the particular filtering application, different optical indices may be considered for optimization. For instance, if filter efficiency is a primary concern, one or more efficiency indices may be represented by optical indices 112. If, on the other hand, a primary goal of a filter is its ability to accurately color-render a work of art, one or more different color rendering indices may be included within the optical indices 112. If a combination of optical indices are important, each may be included (or a subset may be included). Even indices not necessarily important for the end-result may be included within the group of indices—for instance, if one simply wants to monitor how one index is affected by the optimization of another index, both indices may be included and considered. Shown in FIG. 1 are ten optical indices. However, more or fewer may be used, as will be understood by those of ordinary skill in the art.

Once an initial spectrum 110 and optical indices 112 are selected, one may vary the spectrum 110 and monitor how the optical indices 112 correspondingly change. The spectrum 110 may be varied in any number of ways as will be apparent to those of ordinary skill in the art. In representative embodiments, spectrum 110 is made up of different mathematical functions termed "contributing functions." Those contributing functions may be varied mathematically to vary the spectrum 110. Alternatively, individual values of spectrum 110 may be changed at different wavelengths or at different ranges of wavelengths. Of course, combinations of these two representative methods may be used, or any other technique to vary one or more characteristics of the spectrum 110 so as to affect a change in one or more indices 112 may also be used.

The type and degree of variation applied to spectrum 110 may also vary according to application. In applications in which there is a high sensitivity between spectrum 110 and one or more key indices 112, the degree of variation applied to spectrum 110 may be made small (and numerous). Alternatively, larger, "rougher" changes to the spectrum may be used as well. The type of variation may be targeted or random. By "targeted" variation, it is meant that the spectrum 110 may be changed in a way believed to favorably affect one or more of the optical indices 112. To achieve targeted variations, one may use one or more neural network applications so that appropriate targeted variations may be "learned" over time. By "random" variation, it is meant that the spectrum 110 may be changed in a seemingly-random manner until a desired result in one or more of the optical indices 112 is achieved. Of course, other types and degrees of variation may be employed, as long as the variations affect a change in one or more of the indices 112.

The spectrum 110 is varied until one or more of the optical indices 112 are optimized for a desired result. For example, consider that a desired result is that optical index 112a have a value greater than X while optical index 112g have a value less than Y. In that case, spectrum 110 is varied until those conditions are met. At that point, the optical indices 112a and 112g are said to be optimized, and the spectrum 110 then represents a customized spectral profile. In fact, it is customized for the application in which optical index 112a has a value greater than X while optical index 112g has a value less than Y. As will be discussed herein, these indices may, in turn, correspond to one or more characteristics of the particular object being illuminated (e.g., its color scheme, brightness, contrast, etc.).

Solver 114 may be used to both vary spectrum 110 and also to optimize one or more of optical indices 112. In particular, solver 114 may be a computational program that varies spectrum 110, monitors the corresponding values of one or more of optical indices 112, determines if optimization has occurred, and repeats the process until optimization is achieved (or until a time-out condition occurs, if optimization is not possible or would be too time-consuming). The exact interface of solver 114 may vary widely. In one embodiment, solver 114 may be the SOLVER feature of MICROSOFT's EXCEL spreadsheet. The SOLVER feature allows different fields to be varied until other fields match one or more requirements. In other embodiments, solver 114 may include software that allows the user to enter which optical index or indices are to be optimized, their optimization values, how the spectrum 110 should be varied, etc. The software may include a graphical user interface or the like. It may include a neural network component if desired as discussed above.

Once spectrum 110 represents a customized spectral profile (upon optimization), a corresponding customized filter may be created by any of several manufacturing mechanisms known in the art. For instance, those of ordinary skill in the art may utilize known techniques to realize a dielectric filter from a particular profile. Any other type of filter other than dielectric filters may be employed, as long as they can be made to correspond to a given profile.

FIGS. 2-8 are schematic diagrams of different aspects of generating a customized spectral profile. The steps in the figures are exemplary only and non-limiting. Each of FIGS. 2-8 may be used to implement aspects of the generalized method of FIG. 1, and each is discussed in turn.

Figure 2:
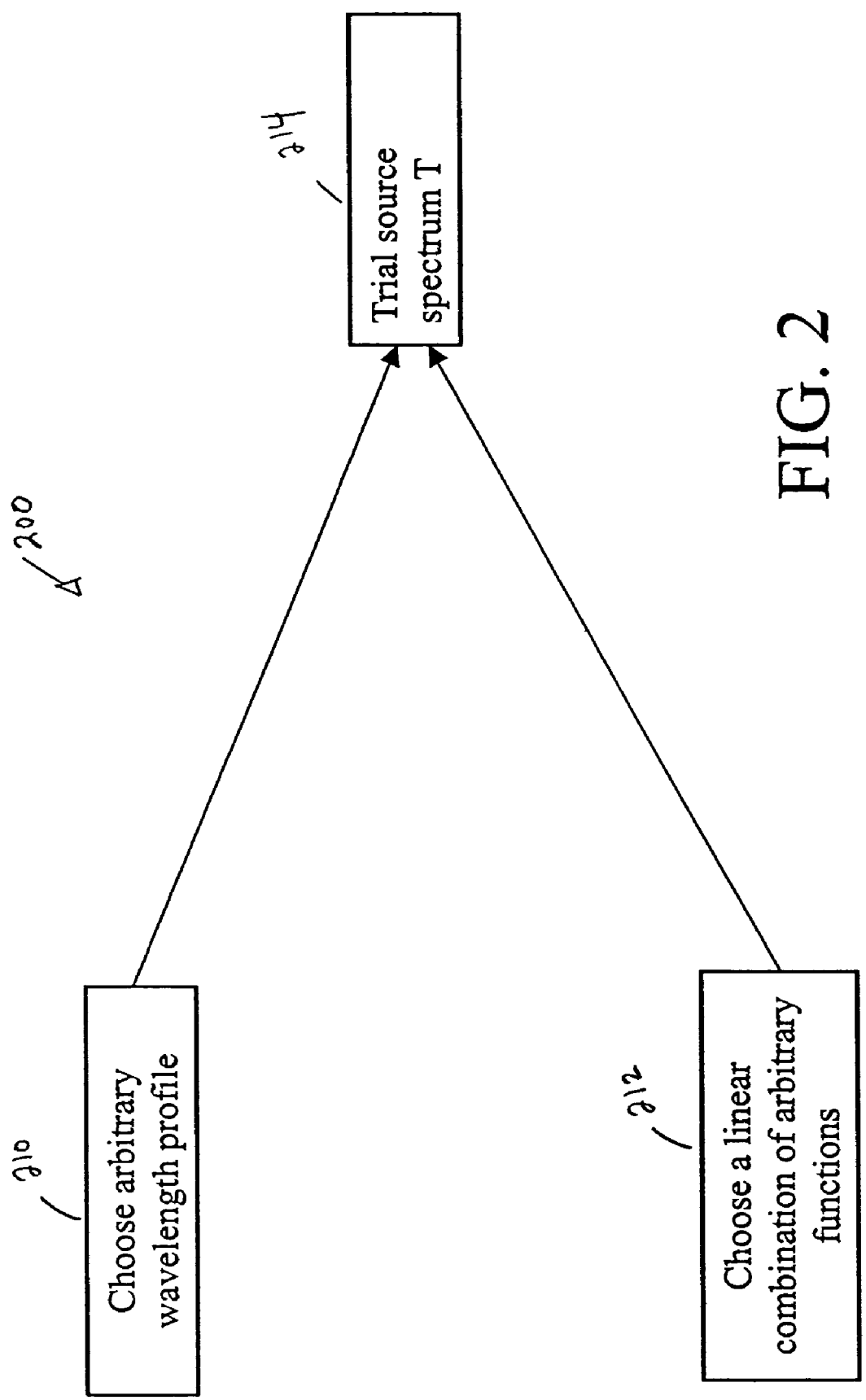
FIG. 2 is a schematic diagram of aspects of generating a customized spectral profile in accordance with embodiments of the present disclosure. A trial source spectrum is generated.

FIG. 2 shows methodology 200 for generating an initial trial source spectrum, which may later be varied as discussed in relation to spectrum 110 of FIG. 1. As illustrated in FIG. 2, trial source spectrum 214 may be generated from one or both of an arbitrary wavelength profile (represented by element 210) or a linear combination of arbitrary mathematical functions (represented by element 212). The mathematical functions may be of any type known in the art suitable for approximating or representing a spectrum. Trial source spectrum 214 is designated as the variable T in subsequent figures.

Figure 3:
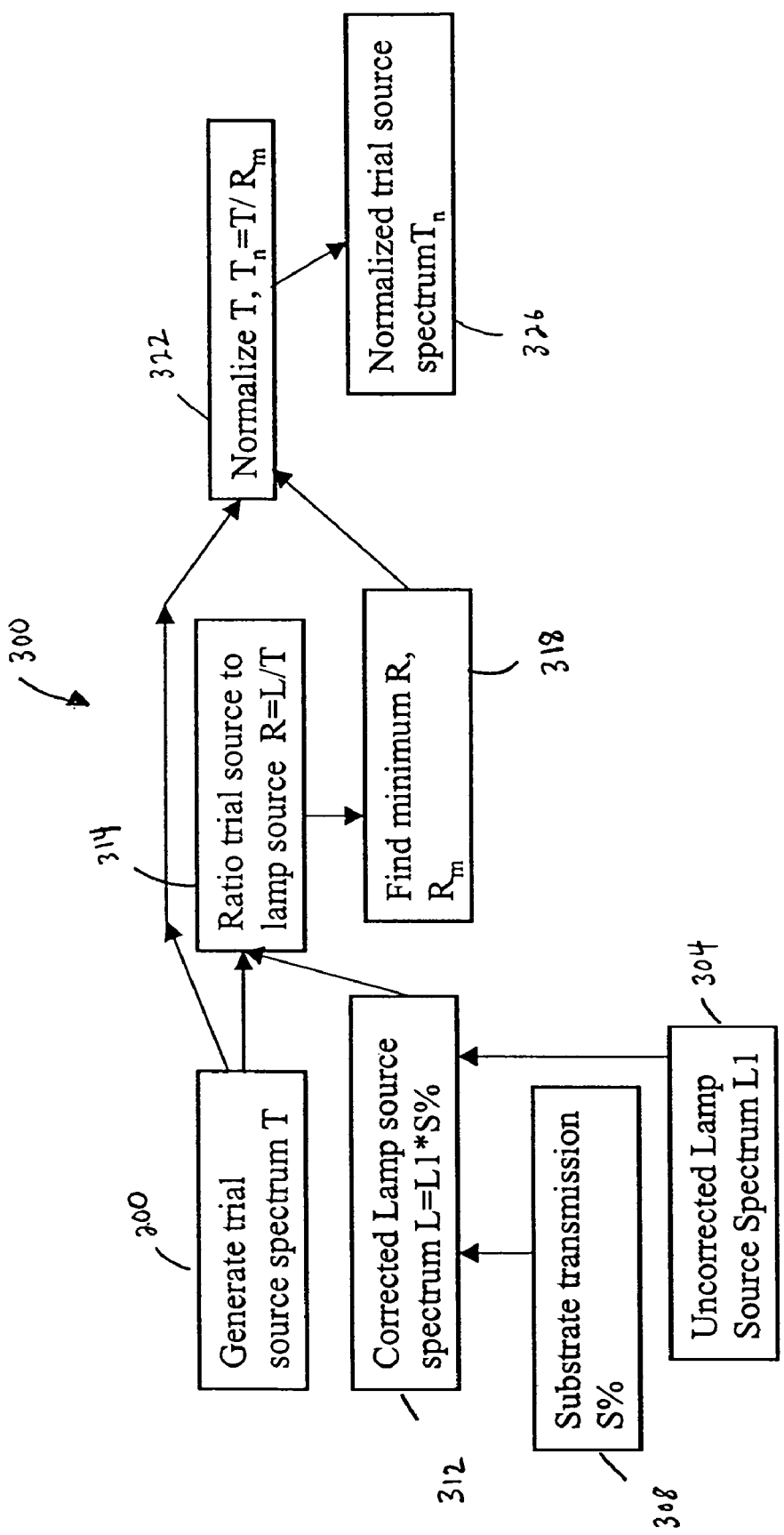
FIG. 3 is a schematic diagram of aspects of generating a customized spectral profile in accordance with embodiments of the present disclosure. An uncorrected lamp source spectrum, a corrected lamp source spectrum, and a normalized trial source spectrum are obtained.

FIG. 3 shows methodology 300 for normalizing trial source spectrum 214, for arriving at a uncorrected lamp source spectrum 304, and for arriving at a corrected lamp source spectrum 312. In step 200, a trial source spectrum is generated. As indicated by the element numbering, the methodology 200 of FIG. 2 may be used for this step. In step 304, an uncorrected lamp source spectrum is determined. Typically, this quantity must be measured in advance from the lamp that will be used for illumination. The actual measurement may be conducted by any of a number of ways known in the art. In step 308, a substrate transmission value may be determined. This parameter corresponds to the transmission value of the filter that will eventually be used to implement the customized spectral profile. Typically, the parameter itself may be determined from the specifications from the glass substrate manufacturer. In step 312, a corrected lamp source spectrum is calculated using the uncorrected source spectrum and the substrate transmission. In step 314, a ratio trial source to lamp source parameter is calculated using the corrected lamp source spectrum and the trial source spectrum. In step 318, a minimum trial source to lamp source value is determined. In step 322, a normalized trial source spectrum 326 is calculated using the trial source spectrum and the minimum trial source to lamp source ratio. In different embodiments, normalization may not be performed, and the trial source spectrum generated in step 200 may be used in lieu of the normalized trial source spectrum 326 in subsequent calculations.

As will be apparent from this disclosure, and particularly from FIGS. 4-9 and their corresponding description, quantities calculated in FIG. 3 may be used to calculate various optical indices 112 of FIG. 1 to use for the basis of optimization. In particular, the normalized trial source spectrum 326 (or the un-normalized trial source spectrum), the uncorrected lamp source spectrum 304, and the corrected lamp source spectrum 312 may be used to calculate, for instance, the following optical indices 112: chromaticity, filter efficiency, lumens per watt efficiency, overall filter efficiency, watt reduction criteria, color rendering index, and modified color rendering index. FIGS. 4-8 separately discuss representative ways to calculate these indices.

Figure 4:
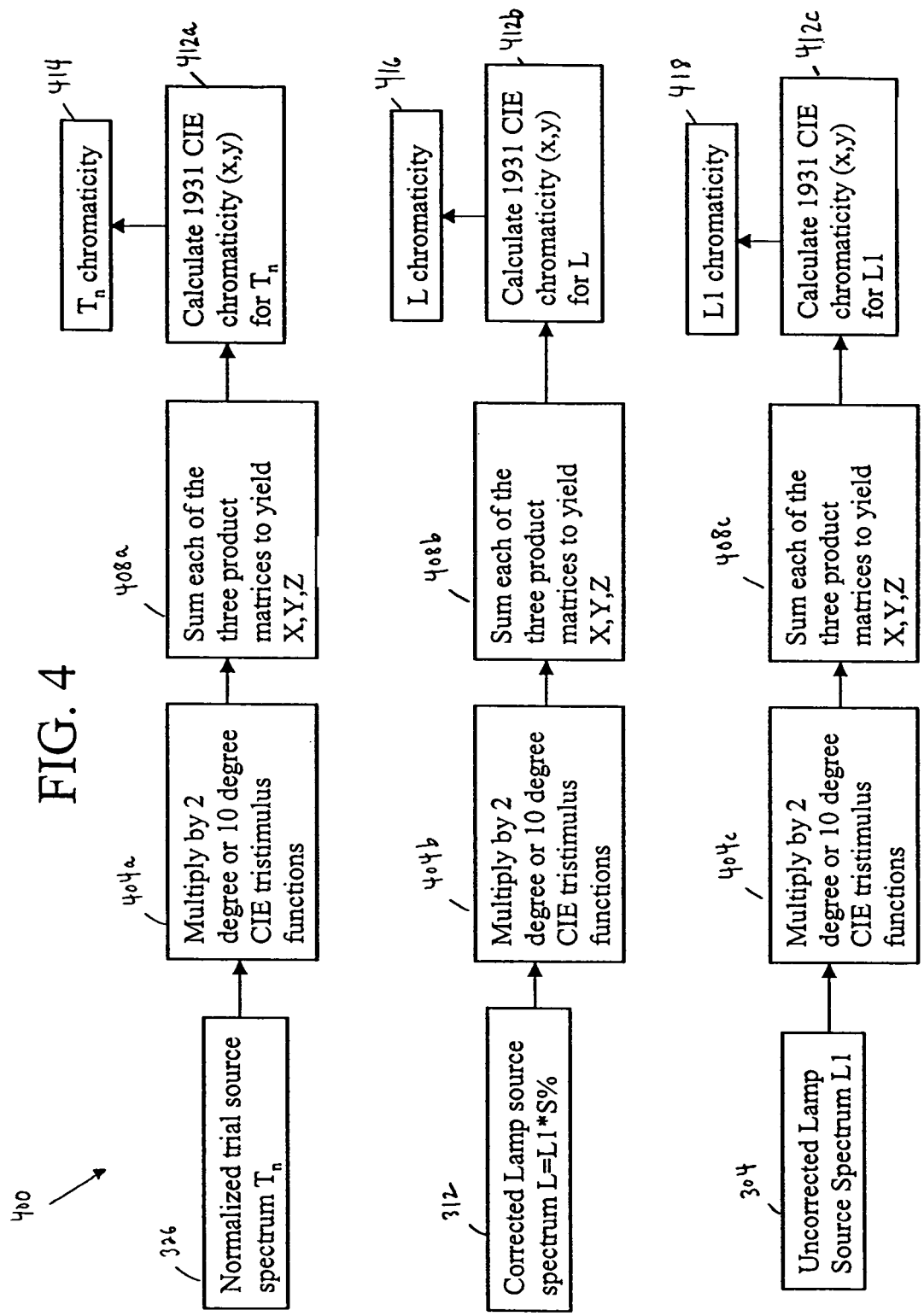
FIG. 4 is a schematic diagram of aspects of generating a customized spectral profile in accordance with embodiments of the present disclosure. Chromaticities are calculated.

FIG. 4 shows methodology 400 for calculating chromaticity optical indices. In the illustrated embodiment, chromaticities are calculated for the normalized trial source spectrum 326, corrected lamp source spectrum 312, and uncorrected lamp source spectrum 304. Calculating each of these chromaticities is achieved along similar lines. In steps 404a-c, the spectrum at issue is multiplied by 2 or 10 degree CIE tristimulus functions. These functions are known in the art. In steps 408a-c, one sums each of the three product matrices to yield X, Y, Z. Techniques to implement this mathematical step are also known in the art. In steps 412a-c, one may calculate the 1931 CIE chromaticity (x,y) for the spectrum at issue. The mathematical underpinnings of this step are known in the art as well. What results from these calculations is a normalized trial source chromaticity 414, a corrected lamp source chromaticity 416, and an uncorrected lamp source chromaticity 418. Each of these may represent an optical index illustrated in FIG. 1, and, accordingly, one or more of these indices may be chosen for optimization to generate a customized spectral profile, which may then be used to generate a corresponding filter. In one embodiment, by using the Planck Blackbody formula known in the art, one may adjust the power distribution of filter light relative to the unfiltered source by way of "setting" the chromaticity of the filtered light. In other words, by optimizing the corrected lamp source chromaticity 416 to a desired value, one may advantageously adjust the power distribution of filter light relative to the unfiltered source to arrive at a desired custom filter.

Figure 5:
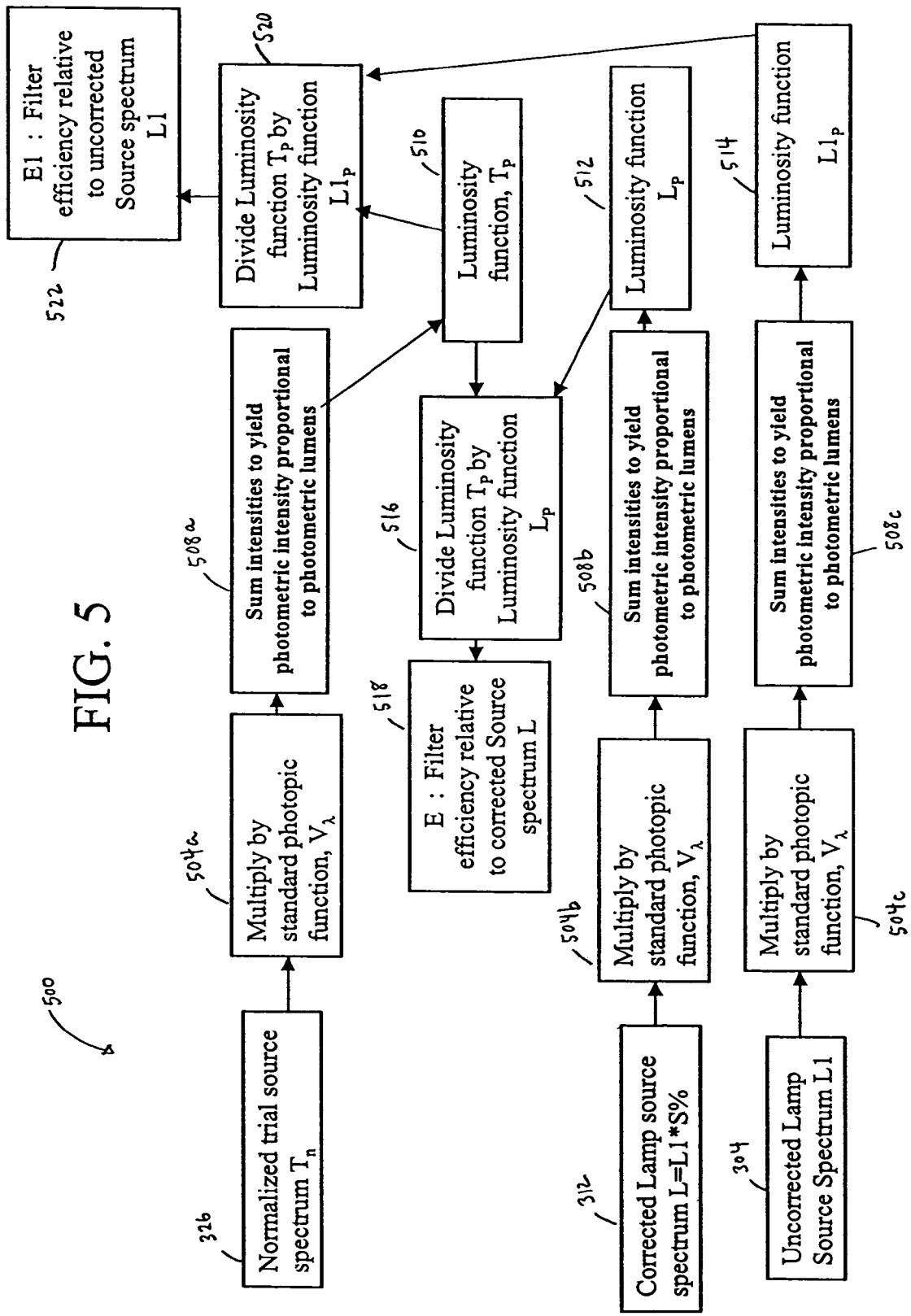
FIG. 5 is a schematic diagram of aspects of generating a customized spectral profile in accordance with embodiments of the present disclosure. Filter efficiencies are calculated.

FIG. 5 shows methodology 500 for calculating filter efficiency optical indices. In the illustrated embodiment, a filter efficiency (E1) relative to the uncorrected source spectrum and a filter efficiency (E) relative to the corrected source spectrum are both calculated. Calculating each of these efficiencies is achieved along similar lines. In steps 504a-c, the respective normalized trial source spectrum, the corrected lamp source spectrum, and the uncorrected lamp source spectrum is multiplied by a standard photopic function, known in the art. In steps 508a-c, one sums intensities to yield the photometric intensity proportional to photometric lumens. For the normalized trial source spectrum, this yields luminosity function $T_p$, 510. For the corrected lamp source spectrum, this yields luminosity function $L_p$, 512. For the uncorrected lamp source spectrum, this yields luminosity function $L1_p$, 514. In step 516, one divides $T_p$ by $L_p$, arriving at efficiency E, 518—the filter efficiency relative to the corrected source spectrum 312. In step 520, one divides $T_p$ by $L1_p$, arriving at efficiency E1, 522—the filter efficiency relative to the uncorrected source spectrum 304.

Note that the filter efficiency E is defined in terms of the corrected source and can be optimized to 100%. Note also that the filter efficiency E1 is defined in terms of the uncorrected source, and in the presence of a nonzero substrate absorption can never be optimized to 100%.

Utilizing two efficiency optical indices reflects that two efficiency criteria are required to take into account (1) optimization toward the original source or (2) optimization toward the substrate filtered source. Either of these criteria represents the efficiency of the filter in transmitting visible light through the filter. Further, these functions may be useful in terms of defining possible bulb upgrades; for example, an E1 of 50% might suggest increasing a bulb wattage by a factor of two.

As was the case with FIG. 4, the efficiencies of FIG. 5 each may represent an optical index illustrated in FIG. 1, and, accordingly, one or more of these indices may be chosen for optimization to generate a customized spectral profile, which may then be used to generate a corresponding filter.

Figure 6:
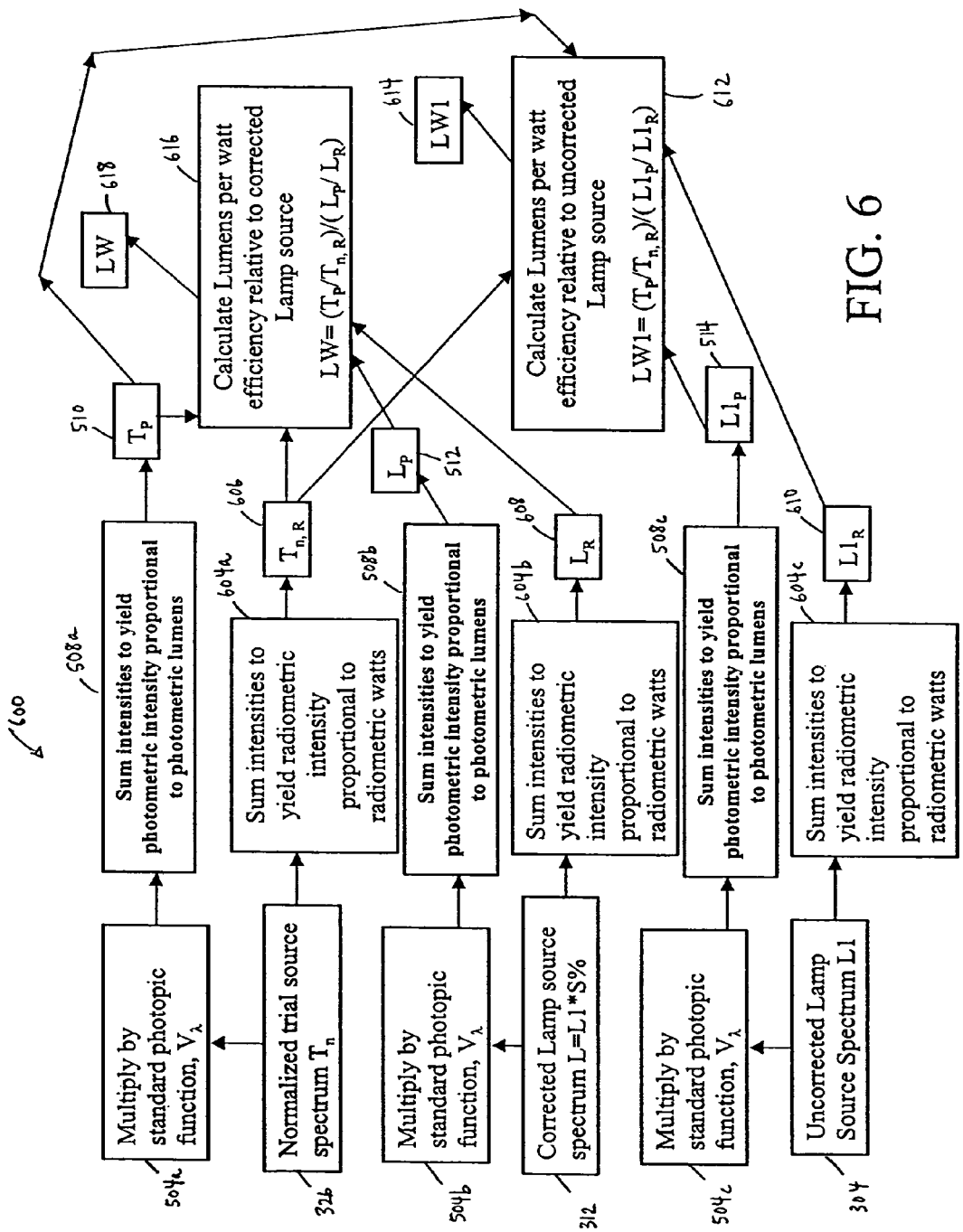
FIG. 6 is a schematic diagram of aspects of generating a customized spectral profile in accordance with embodiments of the present disclosure. Lumens per watt efficiencies are calculated.

FIG. 6 shows methodology 600 for calculating lumens-per-watt-efficiency optical indices. In the illustrated embodiment, a lumens per watt efficiency (LW1) relative to the uncorrected source spectrum and a lumens per watt efficiency (LW) relative to the corrected source spectrum are both calculated. Calculating each of these efficiencies is achieved along similar lines and is similar to the steps illustrated in FIG. 5. In fact, calculating the lumens per watt efficiency uses $T_p$, $L_p$, and $L1_p$ calculated in FIG. 5. Accordingly, the steps to arrive at those functions are identical and won't be repeated. In steps 604a-c respectively, intensities of the respective normalized trial source spectrum, the corrected lamp source spectrum, and the uncorrected lamp source spectrum are summed to yield radiometric intensity proportional to radiometric watts. For the normalized trial source spectrum, this yields $T_{n,r}$, 606. For the corrected lamp source spectrum, this yields $L_R$, 608. For the uncorrected lamp source spectrum, this yields $L1_R$, 610. In step 616, one calculates lumens per watt efficiency relative to the corrected lamp source using the equation provided, arriving at lumens per watt efficiency LW, 618. In step 612, one calculates lumens per watt efficiency relative to the uncorrected lamp source using the equation provided, arriving at lumens per watt efficiency LW1, 614.

The quantity LW1 is the ratio of the ratio of conversion of radiometric watts to phototopic lumens for the trial spectrum to the ratio conversion of radiometric watts to phototopic lumens for the uncorrected source lamp. Typically, one wants the trial spectrum to generate more phototopic lumens per radiometric watt than the uncorrected source lamp. A value of LW1 greater than 100% assures this.

The quantity LW is the ratio of the ratio of conversion of radiometric watts to phototopic lumens for the trial spectrum to the ratio conversion of radiometric watts to phototopic lumens for the corrected source lamp. Typically, one wants the trial spectrum to generate more phototopic lumens per radiometric watt than the corrected source lamp. A value of LW greater than 100% assures this.

Note that in the presence of substrate absorption, optimization toward LW1 and LW are not equivalent. Also note that optimization alone toward LW1 or LW can be detrimental toward the filter efficiency constraints E and E1. To account for this, one may create a new overall filter efficiency, discussed in relation to FIG. 7.

As was the case with FIGS. 4 and 5, the efficiencies of FIG. 6 each may represent an optical index illustrated in FIG. 1, and, accordingly, one or more of these indices may be chosen for optimization to generate a customized spectral profile, which may then be used to generate a corresponding filter.

Figure 7:
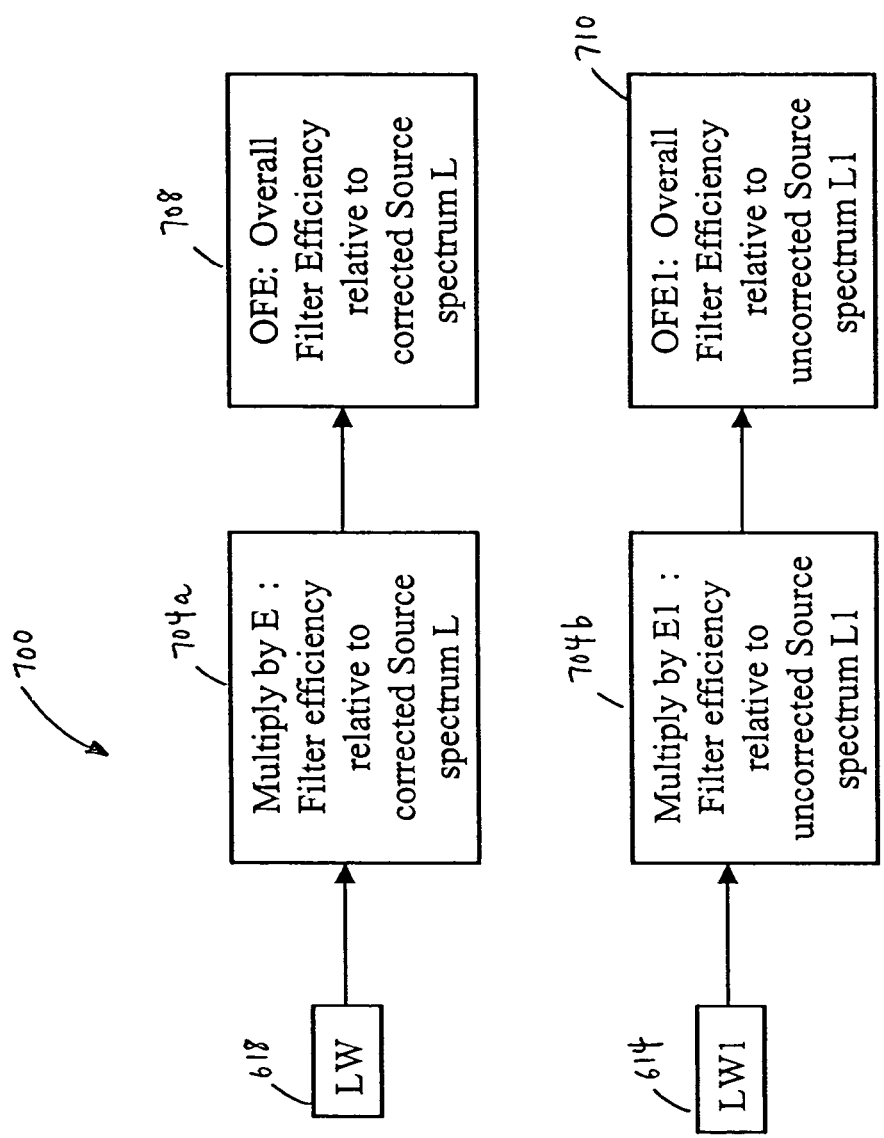
FIG. 7 is a schematic diagram of aspects of generating a customized spectral profile in accordance with embodiments of the present disclosure. Overall filter efficiencies are calculated.

FIG. 7 shows methodology 700 for calculating overall filter efficiency optical indices. In the illustrated embodiment, an overall filter efficiency (OFE1) relative to the uncorrected source spectrum and an overall filter efficiency (OFE) relative to the corrected source spectrum are both calculated. Calculating each of these efficiencies is achieved along similar lines. In step 704a, LW from FIG. 6 is multiplied by the filter efficiency E of FIG. 5. This yields OFE, 708—the overall filter efficiency relative to the corrected source spectrum. In step 704b, LW1 from FIG. 6 is multiplied by the filter efficiency E1 of FIG. 5. This yields OFE1, 710—the overall filter efficiency relative to the uncorrected source spectrum.

Note that a value of OFE or OFE1 greater than 100% is necessary for any filter where one desires to lower overall power relative to the unfiltered source. By using OFE and OFE1 as constraints, one can assure that even with low filter efficiencies (E or E1), one can design a beneficial filter. In that circumstance, as E (or E1) declines, LW (or LW1) will increase as an offset.

As was the case with FIGS. 4-6, the efficiencies of FIG. 7 each may represent an optical index illustrated in FIG. 1, and, accordingly, one or more of these indices may be chosen for optimization to generate a customized spectral profile, which may then be used to generate a corresponding filter.

FIG. 8 shows methodology 800 for calculating a watt reduction criteria—the percent of lamp power through the filter. In step 804, $L1_R$ and $T_{n,R}$ of FIG. 6 are used according to the provided equation to calculate the watt reduction criteria WR.

This optimization criteria reflects the desire to reduce overall power by way of the filter. However, without a significant (>100%) value of LW (or LW1), and an OFE (or OFE1) greater than 100%, watt reduction alone is not sufficient. In other words, reducing radiometric watts by reducing photometric lumens offers no advantage, necessarily.

As was the case with FIGS. 4-7, the criteria of FIG. 8 may represent an optical index illustrated in FIG. 1, and, accordingly, it may be chosen for optimization to generate a customized spectral profile, which may then be used to generate a corresponding filter.

Figure 9A:
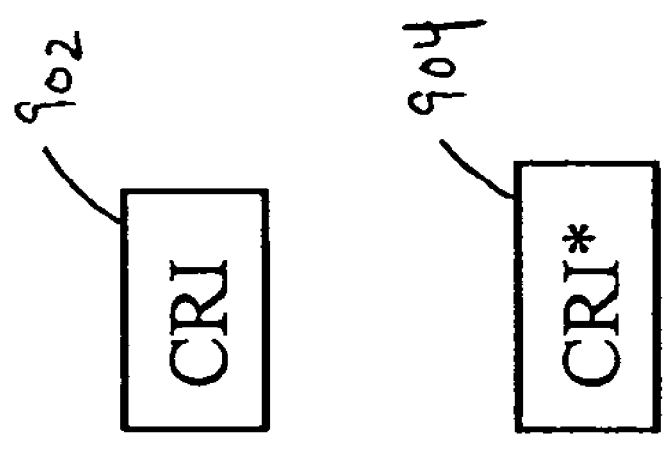
FIG. 9A is a schematic diagram of aspects of generating a customized spectral profile in accordance with embodiments of the present disclosure. A color rendering index criteria and a modified color rendering index are calculated.

FIG. 9A illustrates that a color rendering index 902 and a modified color rendering index 904 may be calculated as optical indices.

CRI 902 may be calculated according to methods known in the art, e.g., using the method of CIE Publication 13.3-1995.

A value of CRI=100 indicates that color rendering of the test source should be identical to color rendering of the reference source. Color rendering of >90 is normally adequate to judge sources reasonably equivalent in color rendering for most people. Color rendering less than 70 would normally suggest the test source to be inadequate for most observers in terms of meeting the same color rendering as the reference source. This criteria normally depends on little difference between the color temperature of the two sources, based on the limited von-Kries implementation of color adaptation. In some circumstances, one may utilize sources of different color temperatures. In this circumstance, one may rely on optimization to a better, optimal, or maximum CRI 902 as the main optimization criteria.

CRI* 904 may be calculated according to methods known in the art, e.g., using the method of CIE Publication 13.3-1995, except that the standard Munsell test samples of Publication 13.3-1995 are, in one embodiment, replaced by reflectance standards taken from the object to be illuminated—e.g., directly from a work of art or from an image of that art. In one embodiment, reflectance data may be taken from a digital image of the object. One representative suitable method to achieve this is given in FIG. 9B.

Figure 9B:
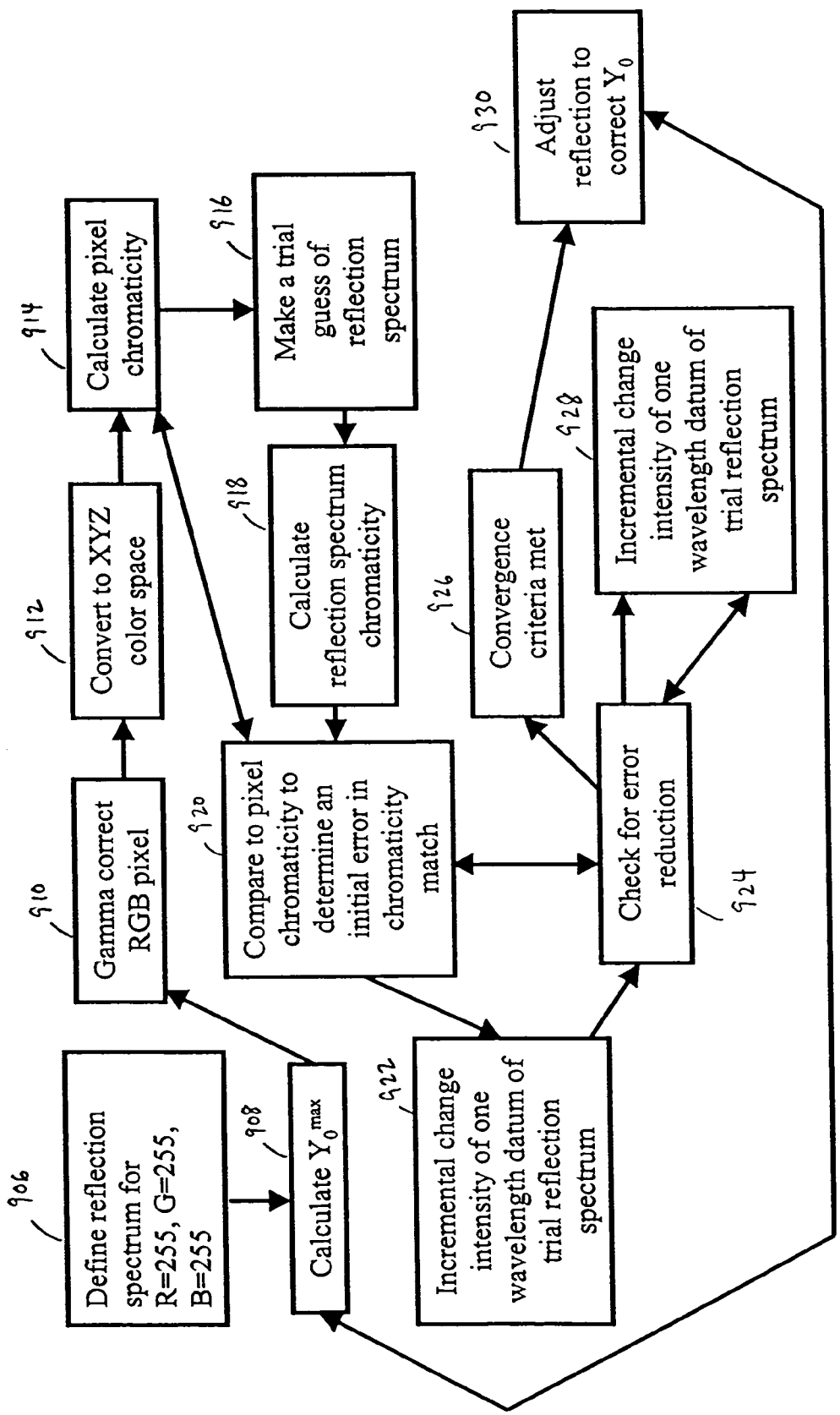
FIG. 9B is a schematic diagram of aspects of generating a customized spectral profile in accordance with embodiments of the present disclosure. A technique for calculating reflection information from a bitmap file is provided.

In FIG. 9B, a technique to calculate reflection data from a bitmap file is presented. This technique permits rapid estimation of reflection data for regions of a work of art from a 24 bit true color bitmap image. The steps of FIG. 9B are self-explanatory, illustrating how pixel chromaticity may be compared to reflection spectrum chromaticity, and an incremental change may be made to a trial reflection spectrum until an error-reduction convergence criteria is met. Having the benefit of the present disclosure, those of ordinary skill in the art will recognize that other techniques may be used to extract appropriate reflectance data from a digital representation of an object to be illuminated.

When one replaces standard Munsell test samples with reflectance standards taken from the object to be illuminated (or from an image or digital representation of that object), individual Ri's based on the reflectance standards from the object (e.g., a work of art) may be weighted as necessary according to need. For example, one may enhance color rendering of one feature over another. Note that replacing the Munsell standards with that from the object (e.g., a work of art) are consistent with the recommendations of CIE Publication 13.3-1995. As with CRI, a value of CRI*=100 indicates that color rendering of the test source should be identical to color rendering of the reference source. Color rendering of >90 is normally adequate to judge sources reasonably equivalent in color rendering for most people. Color rendering less than 70 would normally suggest the test source to be inadequate for most observers in terms of meeting the same color rendering as the reference source. This criteria normally depends on little difference between the color temperature of the two sources, based on the limited von-Kries implementation of color adaptation. In some circumstances, one may utilize sources of different color temperatures. In this circumstance, one may rely on optimization to a better, optimal, or maximum CRI* 904 as the main optimization criteria.

By optimizing one or both of the color rendering indices of FIG. 9A, it will be apparent that one may effectively build a filter that renders only photometric light—transmits visible-light photons that significantly affect the visualization (e.g., light necessary for proper color rendering) while blocking photons unneeded for this task. Using the modified color rendering index 904 of FIG. 9A, one may build such a filter customized for a particular object, such as a work of art. Alternatively, one may correct the rendering of an object, such as a work of art. For instance, one may enhance one or more colors, correct for vision loss, correct for damaged or faded works of art, or correct for any other type of problem that would benefit from the filtering of the present disclosure.

Accordingly, and as was the case with FIGS. 4-8, the color rendering index and modified color rendering index of FIG. 9 each may represent an optical index illustrated in FIG. 1, and, accordingly, may be chosen for optimization to generate a customized spectral profile, which may then be used to generate a corresponding filter.

Figure 10:
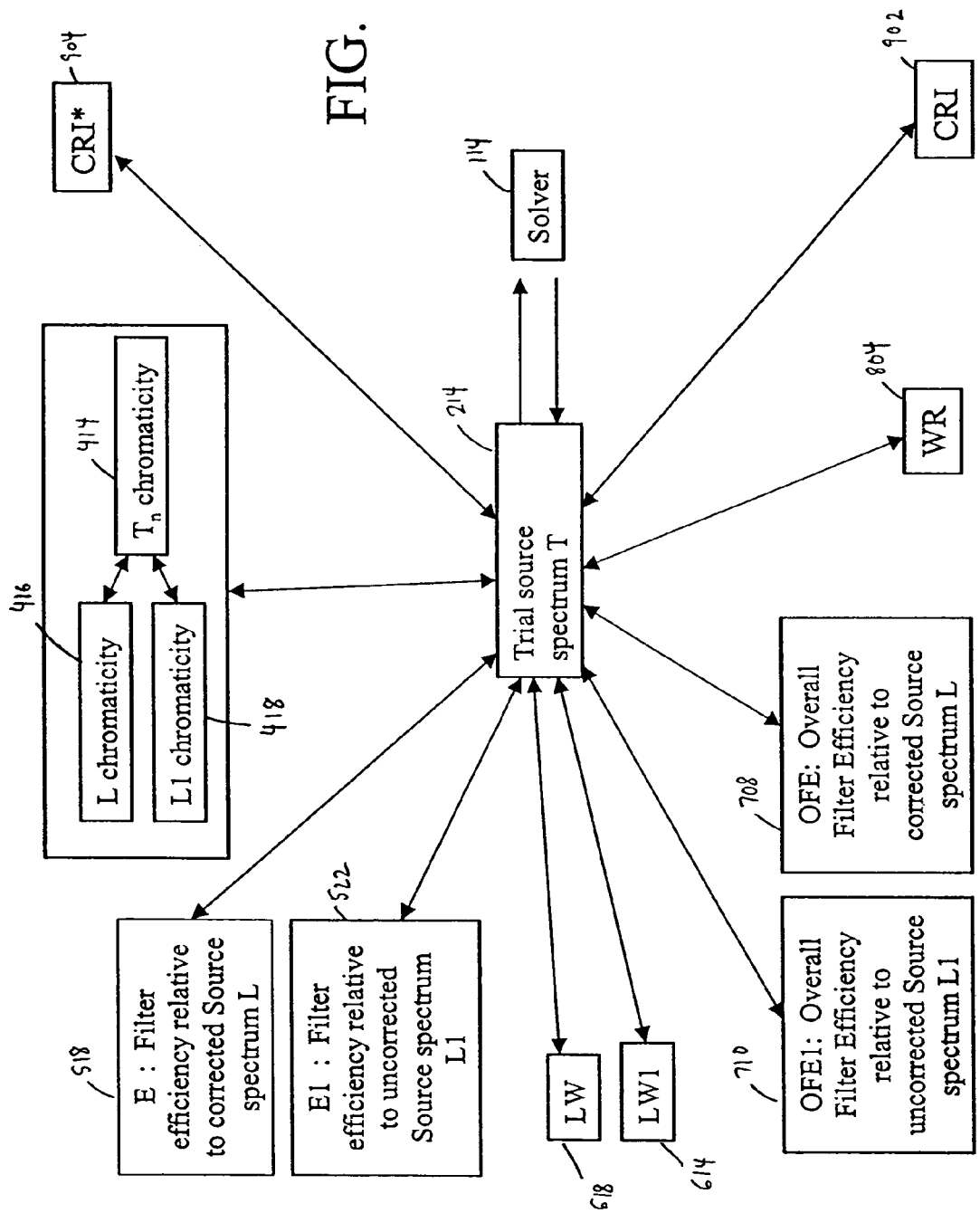
FIG. 10 is a schematic diagram of a method for generating a customized spectral profile in accordance with embodiments of the present disclosure.

FIG. 10 is a schematic diagram of a method for generating a customized spectral profile in accordance with embodiments of the present disclosure. FIG. 10 is similar to FIG. 1 (and its description therefore will not be repeated). However, FIG. 10 is representative of preferred embodiments, in that it brings together concepts from FIGS. 2-9. As apparent through comparison with FIG. 1, the optical indices 112 of FIG. 1 may include the indices calculated and discussed with relation to FIGS. 2-9. Trial source spectrum 214 (or normalized trial source spectrum 326) may be varied to optimize one or more of the indices shown in FIG. 10 to arrive at a customized spectral profile, which may then be used to create a corresponding filter. As will be apparent to those of ordinary skill in the art, depending on which optical index or indices are optimized, one may achieve virtually any type of filter. Representative filters include, but are not limited to, filters that (a) protect an object from photodamage, (b) aesthetically render an object, and/or (c) correct the rendering of an object.

Figure 11:
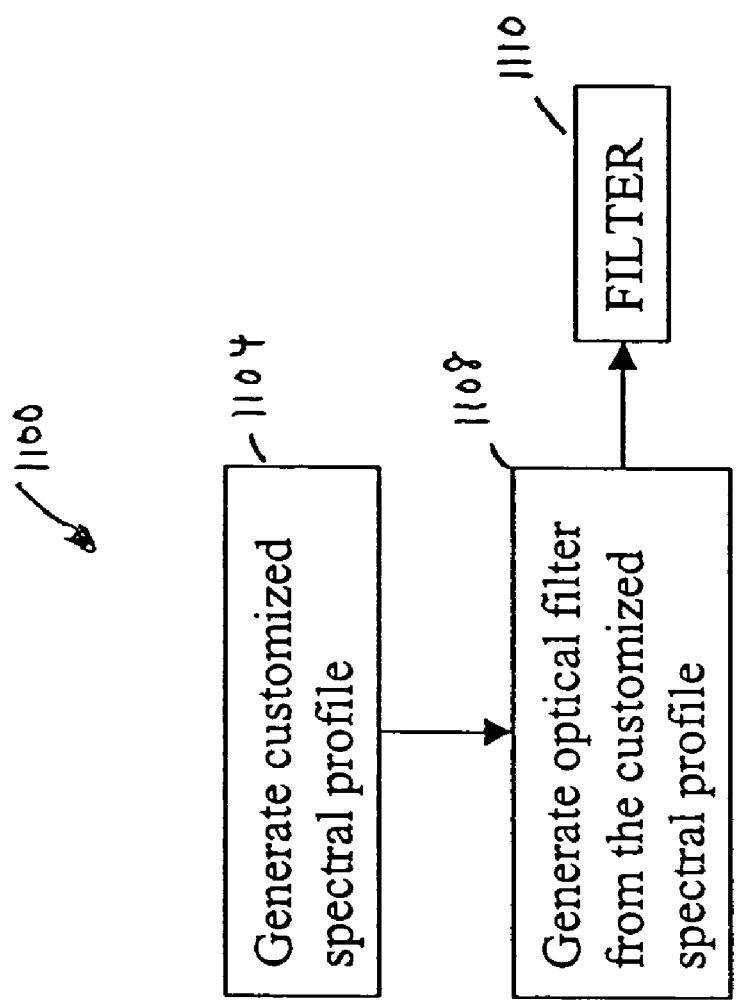
FIG. 11 is a schematic diagram showing the creation of a corresponding filter from a customized spectral profile in accordance with embodiments of the present disclosure.

FIG. 11 is a schematic diagram showing the creation of a corresponding filter from a customized spectral profile in accordance with embodiments of the present disclosure. This figure is included to illustrate what has been mentioned throughout this disclosure: once a customized spectral profile is created, one may create a corresponding filter. Methodology 1100 includes steps 1104 and 1108 to create filter 1110. In step 1104, a customized spectral profile is created. FIGS. 1-9 may be used for this step. In step 1108, a filter 1110 is created. This step may entail any of many known manufacturing techniques in which a custom profile is realized in the form of a filter, such as but not limited to, dielectric filters.

Figure 12:
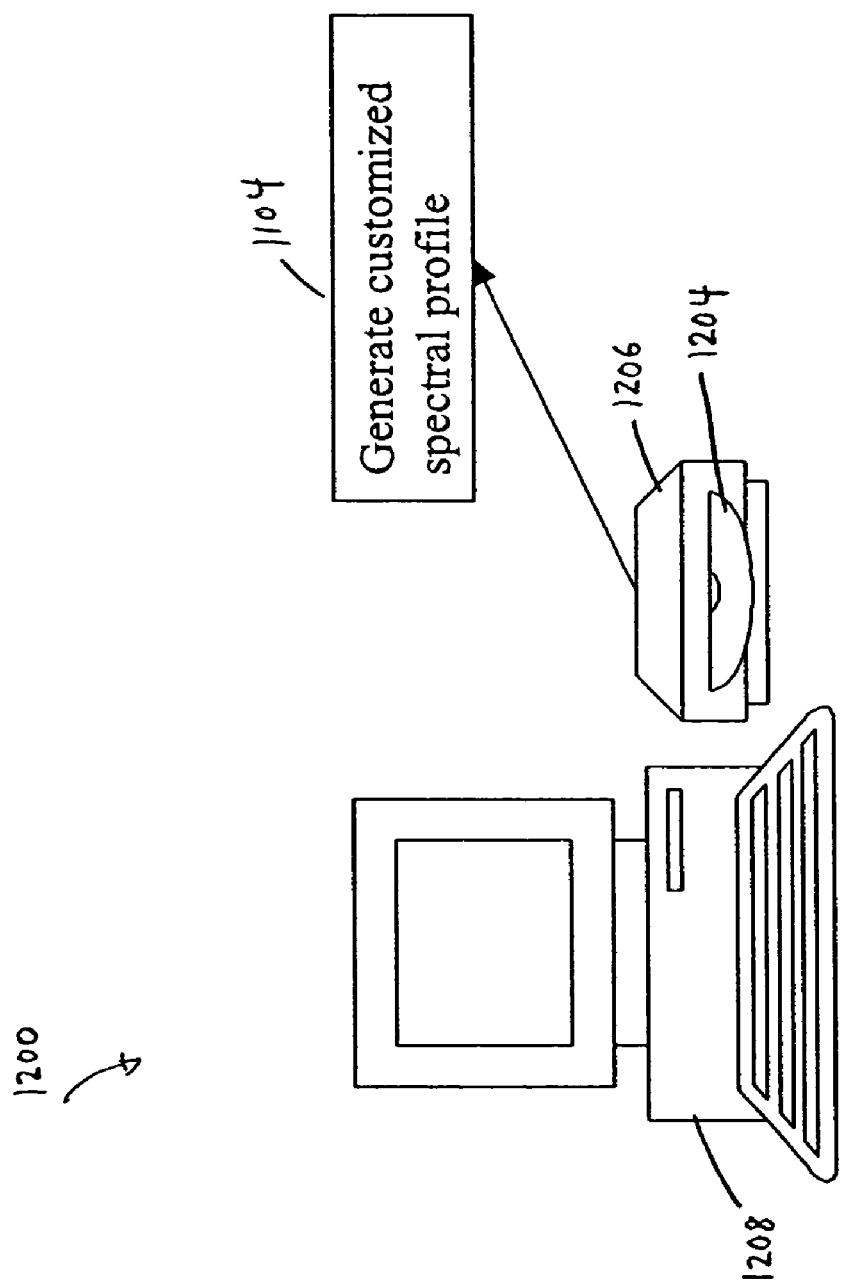
FIG. 12 is a schematic diagram showing a computer readable media programmed with instructions for generating a customized spectral profile in accordance with embodiments of the present disclosure.

FIG. 12 is a schematic diagram showing a computer readable media programmed with instructions for generating a customized spectral profile in accordance with embodiments of the present disclosure. System 1200 includes a computer 1208 and a CD ROM drive 1206. In one embodiment, instructions for generating a customized spectral profile 1104 may be placed onto CD 1204 for execution by computer 1208. Those of ordinary skill in the art will recognize that the instructions may be placed, instead, on the hard drive of computer 1208, on a different removable type of memory, in RAM, or in any other form as long as computer 1208 (or another computing device) can carry out the instructions. The instructions themselves may be coded using any computer language suitable for translating the steps of this disclosure into computer code. In one embodiment, C++ may be used. In another embodiment, the steps may be incorporated into a spreadsheet, such as the MICROSOFT EXCEL spreadsheet program. In such an embodiment, solver 114 of FIGS. 1 and 10 may correspond to the SOLVER functionality of that software.

The following examples are included to demonstrate specific, non-limiting embodiments of this disclosure. It should be appreciated by those of skill in the art that the techniques disclosed in the examples that follow represent techniques discovered to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

Issues to embodiments of this disclosure include the ability to optimize a filter designed specific for a particular light source. In applications of museum light filtration, the main light sources are MR QTH incandescent sources with color temperatures typically from 2900K to 3400K. One normally will design a filter for a source of a given color temperature. However, in this disclosure, one is not restricted to filtering non-incandescent sources or sources of color temperatures only within this range.

Once a lamp source is determined, one may define what one wants to achieve. There are five representative variables or goals one can optimize toward.
1. Color rendering index
2. Filter efficiency
3. Luminance/watt efficiency
4. Overall efficiency
5. Color temperature or chromaticity of filtered light One embodiment of the invention involves being able to solve for a filter that is optimized for one or more of these features. As an example, we show a filter that will take a 3000K incandescent source and render the minimum amount of non-photopic light. In other words, this filter minimizes light which doesn't contribute to vision. In radiometric and photometric language, non-photometric radiometric light is minimized while otherwise maintaining the color rendering and/or color temperature, and/or filter efficiency, and/or overall efficiency.

converting radiometric watts into photometric lumens. If the luminance/watt efficiency were less than 100%, the filter would be doing a poorer job at providing lumens for the radiometric watts of light emitted. The illustrated filter is quite good at this: 173%. The overall efficiency takes into account that one might have a poor filter efficiency, but a terrific luminance efficiency. As long as this number is above 100%, the filter is potentially useful given other characteristics are satisfactory. Generally, this filter preserves the color temperature, preserves color rendering, and significantly reduces unnecessary radiometric watts.

Figure 13:
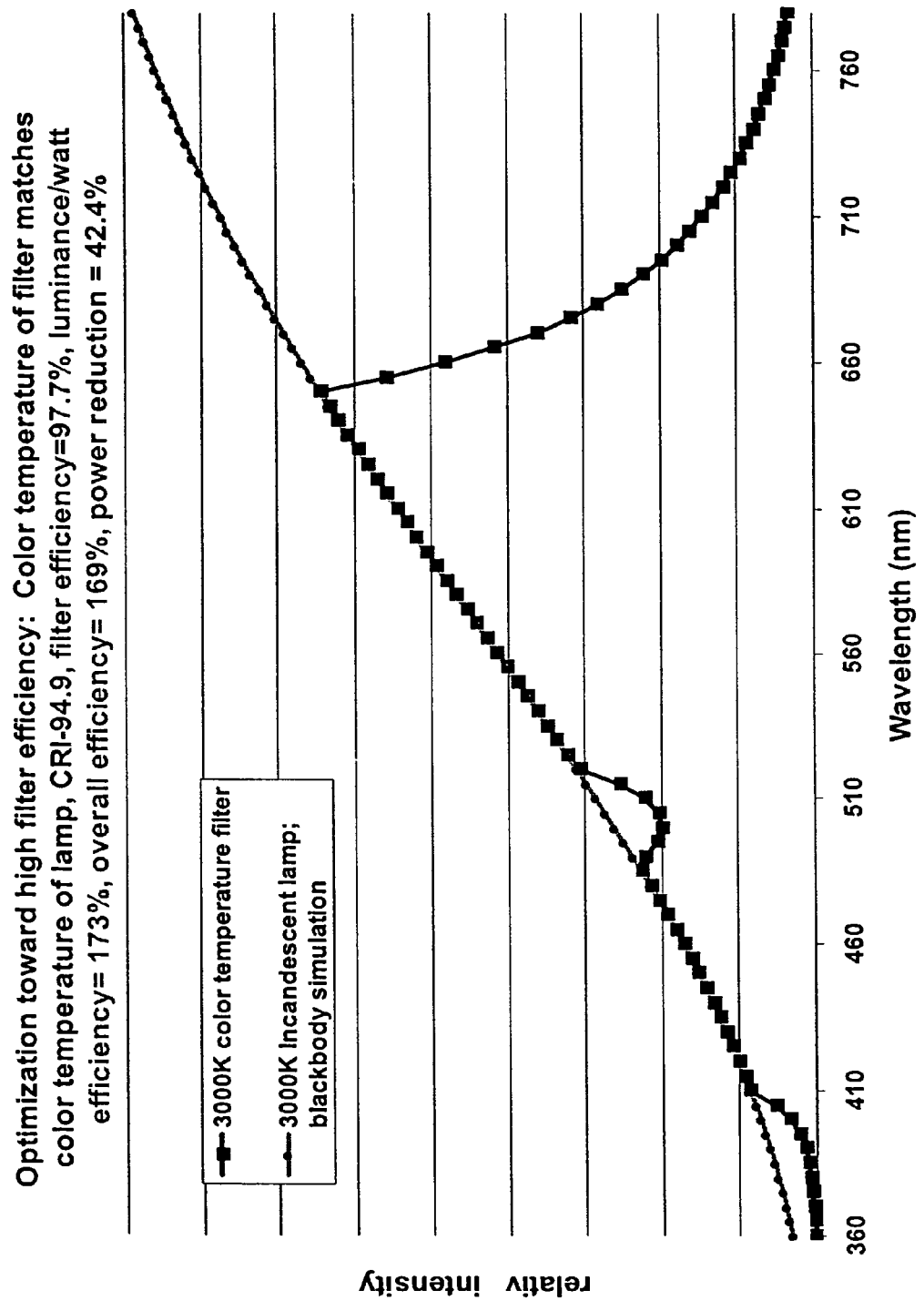
FIG. 13 illustrates representative customized spectral profiles for filter designs in accordance with embodiments of the present disclosure.
Figure 14:
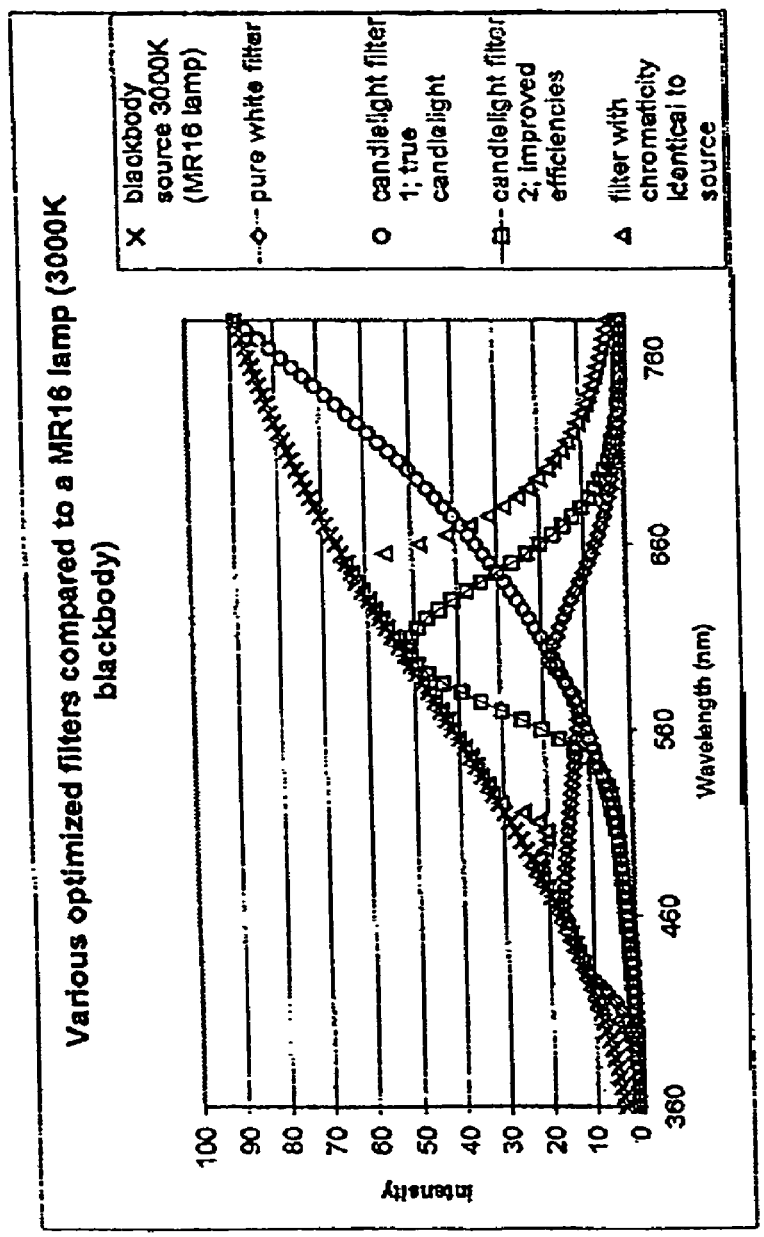
FIG. 14 illustrates representative customized spectral profiles for filter designs in accordance with embodiments of the present disclosure.
Figure 15:
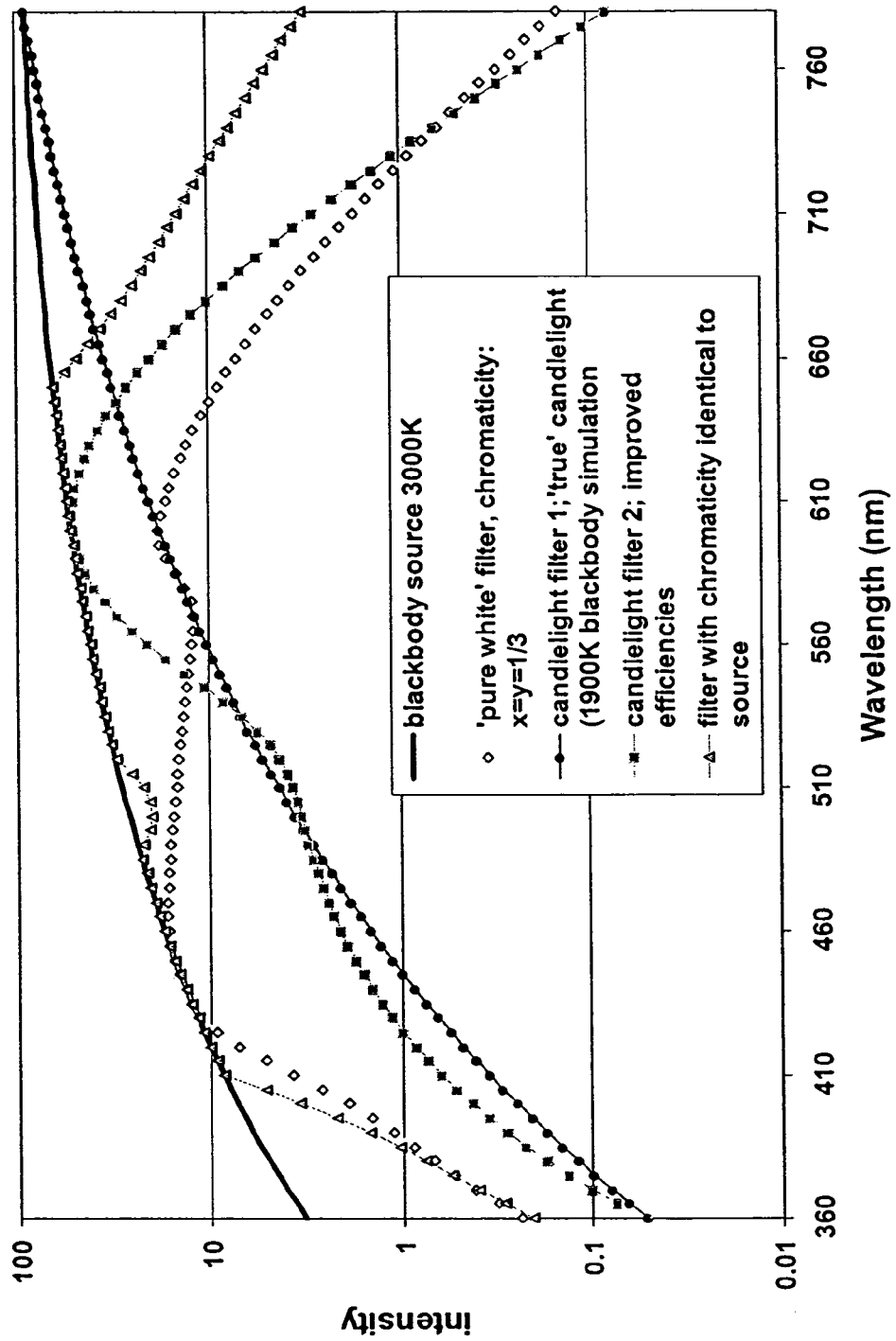
FIG. 15 illustrates representative customized spectral profiles for filter designs in accordance with embodiments of the present disclosure.
Figure 16:
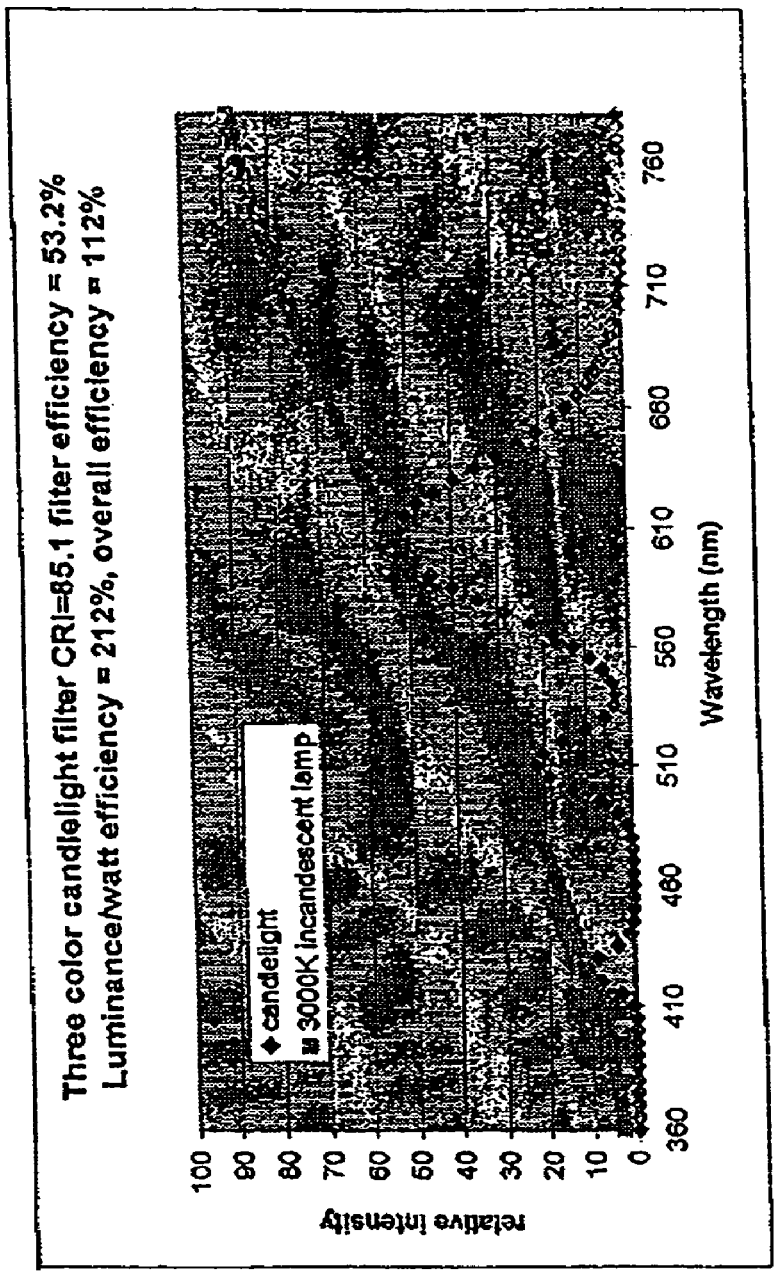
FIG. 16 illustrates representative customized spectral profiles for filter designs in accordance with embodiments of the present disclosure.

The next set of figures, FIGS. 14-16, illustrate characteristics of FIG. 13 as well as some candlelight filter options. Candlelight is a potentially desirable form of illumination for at least two reasons:
  a) Most artwork was created under candle/lamp light prior to the invention of the gas mantle lamp in the 1830s.
  b) Candlelight minimizes higher energy photons that would produce the most photochemical damage.

FIGS. 13-16 provided illustrate (normal plot, and log) the original 3000K source, the filter showed at the beginning of this example section, "true" candlelight, a pure white filter, and an average candlelight filter. One important thing to note is that at the blue, low-wavelength end, the intensity of the light for candlelight drops well below the original source or the non-candlelight filters. This is very important to recognize because it implies that true candlelight or a filter that renders candlelight significantly attenuates the most damaging high energy photons.

What follows below in Table 1 are representative data for those filters.

TABLE 1

| Light sources | 1931 CIE Chromaticity x | 1931 CIE Chromaticity y | Filter efficiency (transmitted visible light; relative to 3000K source) | Lumens/watt efficiency (relative to 3000K source) | CRI - Color rendering index (reference is 3000K blackbody lamp) |
|---|---|---|---|---|---|
| Blackbody source; 3000K MR16 lamp | 0.4369 | 0.4041 | 100 | 100% | 100 |
| Pure white filter | 0.3333 | 0.3333 | 31.5% | 172.6% | 58.7 |
| Candlelight filter 1; true candlelight | 0.5378 | 0.4112 | 28.2% | 53.0% | 54.7 |
| Candlelight filter 2; improved efficiencies | 0.5378 | 0.4112 | 59.9% | 225% | 64.3 |
| Filter with chromaticity identical to source | 0.4369 | 0.4041 | 97.7% | 172.8% | 94.7 |

FIG. 13 is an example filter for a 3000K (Q)TH source that renders only photometric light. Note that the CRI of 94.9 is slightly lower than the 100 of the original source, but may be made higher in similar designs. However, a CRI this high is probably indistinguishable for the average viewer, if not most viewers. The filter efficiency is generally how effectively visible light is transmitted. One typically wants that as high as possible so there is no need to increase the lamp output. The illustrated filter requires no increase in lamp output. The luminance/watt efficiency is generally a measure of the relative efficiency of the lamp with and without the filter of As apparent from Table 1, one may not want a pure white light because it has relatively poor color rendering and its overall efficiency (52%; multiply the other two numbers to get this) is less than 100%, and CRI is not great.

"True" candlelight may, in some circumstances, not be worth trying to create by filtering since it generally has a terrible overall efficiency, and color rendering is not great.

One may dramatically improve the candlelight filter (candlelight filter #2) in terms of efficiency, but color rendering is still not great, but may be acceptable for many viewers.

In FIG. 16, an improved candlelight filter is illustrated. This filter is representative of the improvements that can be made. Using the techniques of this disclosure, even further improvements and modifications can be readily made.

The filter of FIG. 16 offers the candlelight advantages as well as a modest reduction in total non-luminous photons. The real advantage is the reduction in high energy photons. Note that up to 410 nm, light transmission is essentially zero. Note the CRI of 85. This filter is a candidate candlelight filter that may keep museum patrons happy, but better protect works of art.

Figure 17:
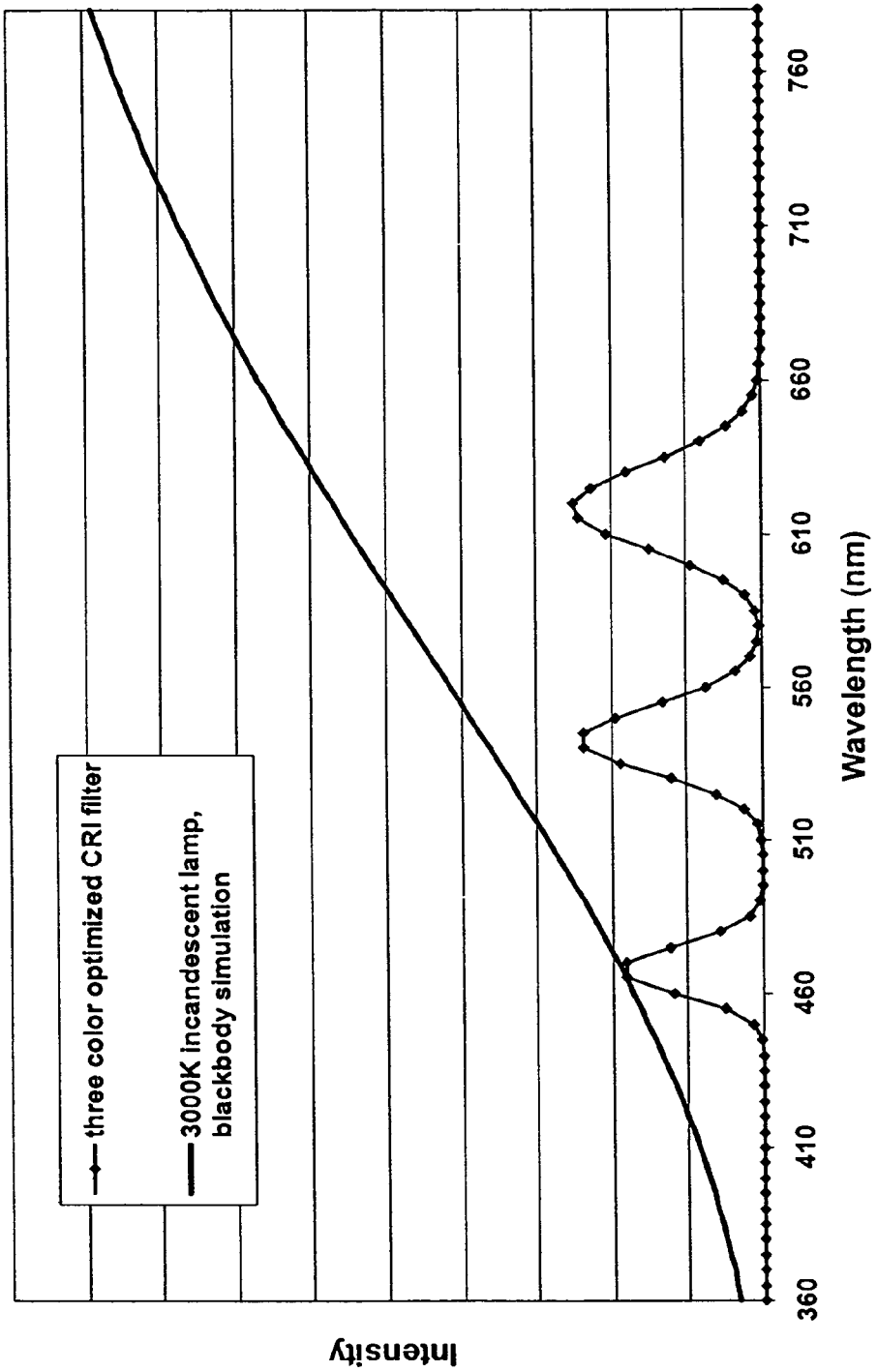
FIG. 17 illustrates representative customized spectral profiles for filter designs in accordance with embodiments of the present disclosure.

FIG. 17 illustrates a different three color filter, whose characteristics are provided on the plot.

FIGS. 18-22 illustrate different spectral profiles customized to the particular object being illuminated—here, the objects are works of art.

Figure 18:
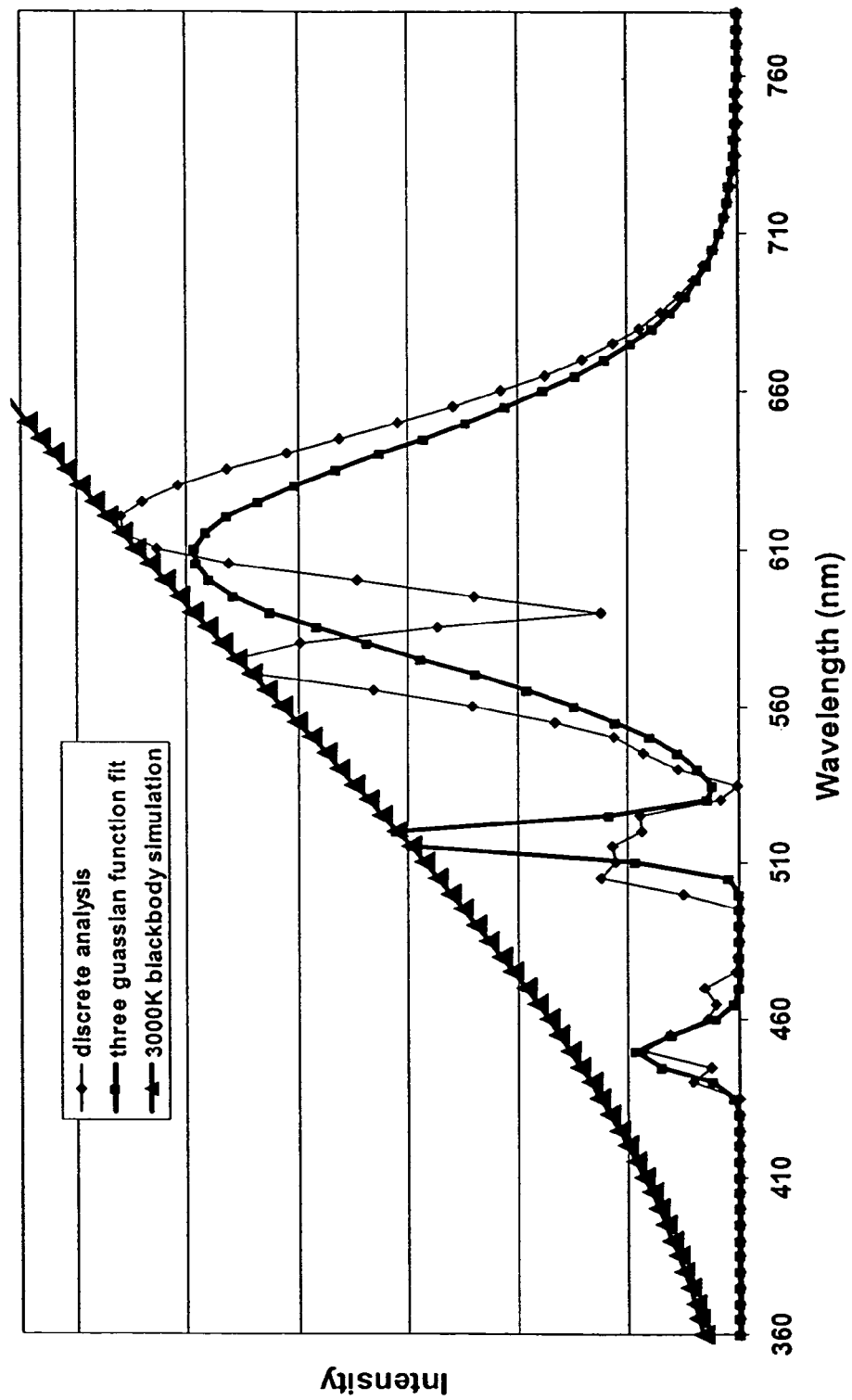
FIG. 18 illustrates representative customized spectral profiles for filter designs in accordance with embodiments of the present disclosure.

FIG. 18 is a comparison of two spectral profiles for filters for Claude Monet's La vu du jardin aux Roses, Musee Marmottan, Paris. This painting was done with Monet's left eye that retained a cataract. These two filters illustrate either using 3 Gaussian functions to best fit for color rendering or by discretely optimizing any point to achieve a best fit. The parameters for this optimization are given below in Table 2:

TABLE 2

|  | Discrete | 3-Gaussian |
| --- | --- | --- |
| CRI | 71.1 | 81.1 |
| CRI* | 93.8 | 83.9 |
| Efficiency | 54% | 52% |
| L/W Efficiency | 203% | 210% |
| Overall Efficiency | 110% | 110% |
| Power Reduction | 73% | 75% |

Note that CRI is the standard CIE color rendering index.
CRI*, in contrast, can rely on reflection spectral data from an image of the painting. By optimizing on actual reflection data from the painting, one may optimize the filters directly to painting features, rather than the arbitrary reflection standards in the normal CIR CRI definition.

Figure 19:
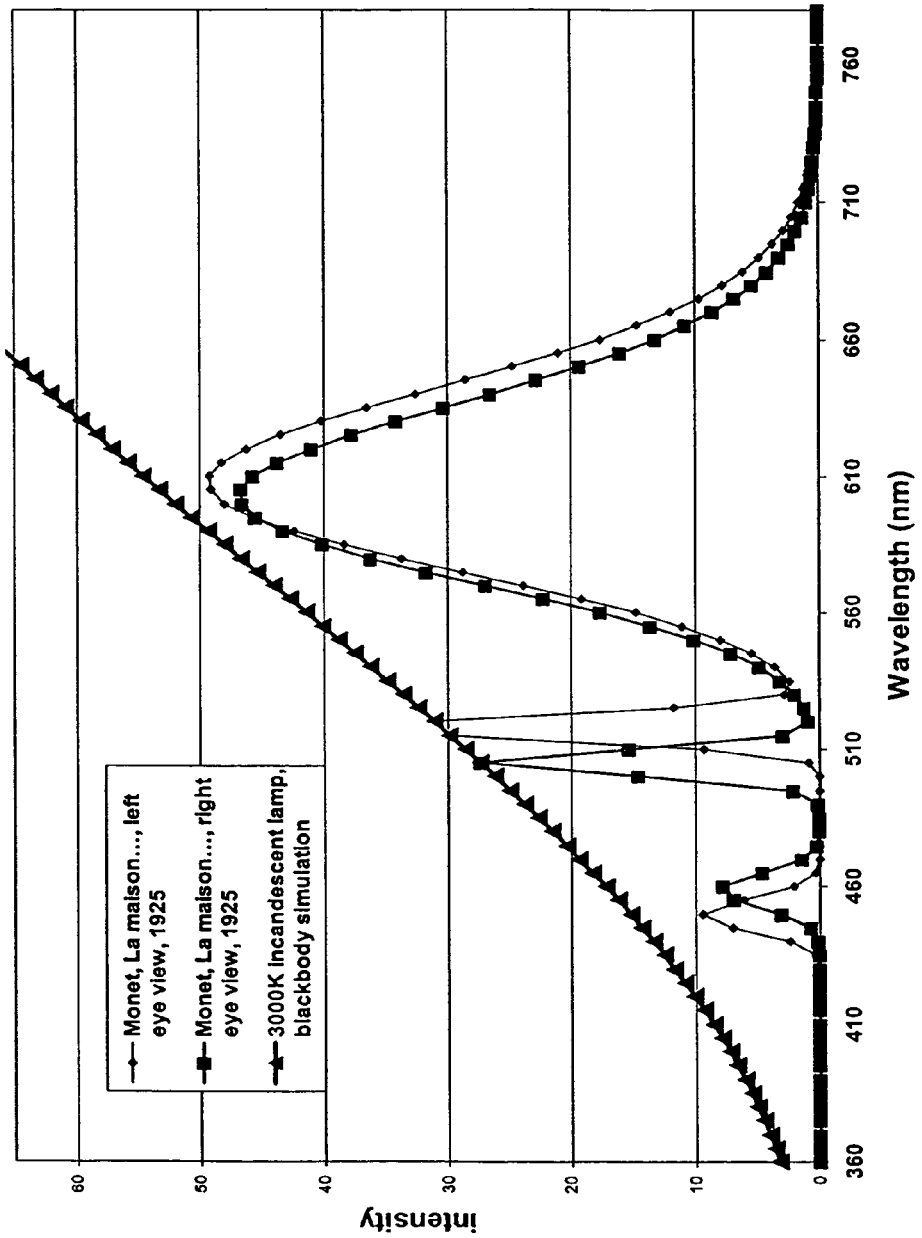
FIG. 19 illustrates representative customized spectral profiles for filter designs in accordance with embodiments of the present disclosure.

In FIG. 19, two different candlelight filters are shown, each being customized to a particular work of art. The two spectral profiles each represent a filter for a particular Monet Painting. The two paintings are the left and right eye view of Monet's La Maison vue dujardin aux Roses. Recall that these two views are separately through an eye with a cataract and an eye with a cataract removed, in 1925. The left-eye view is heavily orange in color, while the right-eye view, absent the cataract, is blue and green in color. These two filters illustrate the level of control the technique provides in optimizing filters for a given work of art.

Each filter was optimized using 3 Gaussian functions. Parameters for the fits are listed in Table 3:

TABLE 3

|  | Right Eye | Left Eye |
| --- | --- | --- |
| CRI | 74.1 | 81.1 |
| CRI* | 87.4 | 83.9 |
| Efficiency | 50.1% | 52% |
| L/W Efficiency | 219% | 210% |
| Overall Efficiency | 110% | 110% |
| Power Reduction | 77% | 75% |

Note that each spectral profile was optimized to CRI*, the color rendering index that can be based on actual reflection data from the paintings themselves. For the example of FIG. 18, the inventor used a procedure to obtain reflection data from images of the paintings (see FIG. 9B).

Figure 20:
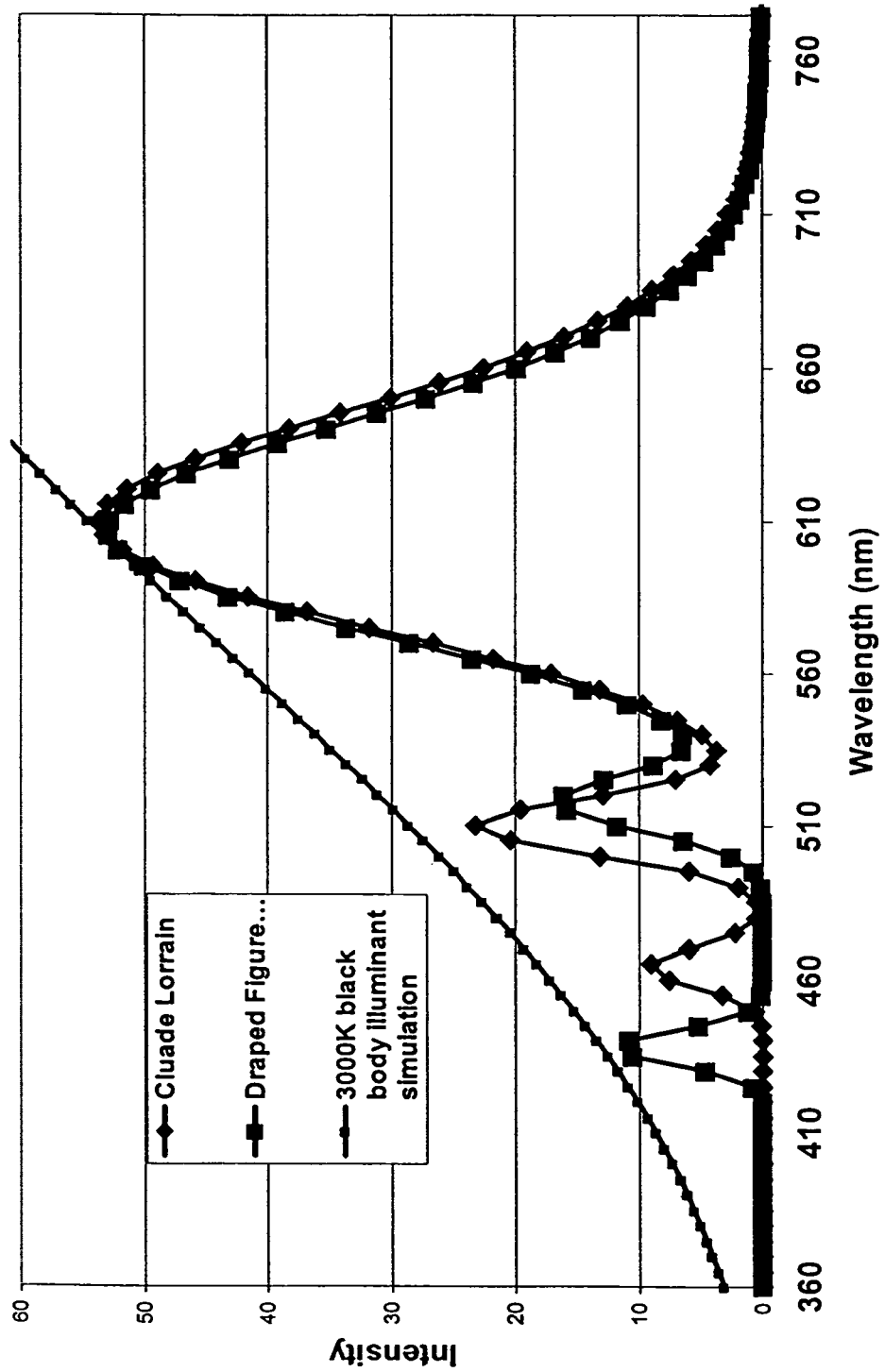
FIG. 20 illustrates representative customized spectral profiles for filter designs in accordance with embodiments of the present disclosure.

FIG. 20 is a comparison of filters for two Getty Museum watercolors, The Draped Figure Holding A Book and Claude Lorrain's Coast Scene with a Fight on a Boat. The Draped Figure is in green colors, while the Coast Scene is done on blue paper so that blue tones dominate. Note that the filters have been optimized toward CRI* so that reflection data from each work was used to optimize to best color rendering.

Fitting data for both is listed in Table 4:

TABLE 4

|  | Claude Lorrain | Draped Figure |
| --- | --- | --- |
| CRI | 75.2 | 75.2 |
| CRI* | 87.3 | 99.9 |
| Efficiency | 58% | 58% |
| L/W Efficiency | 210% | 210% |
| Overall Efficiency | 122% | 122% |
| Power Reduction | 72% | 72% |

Figure 21:
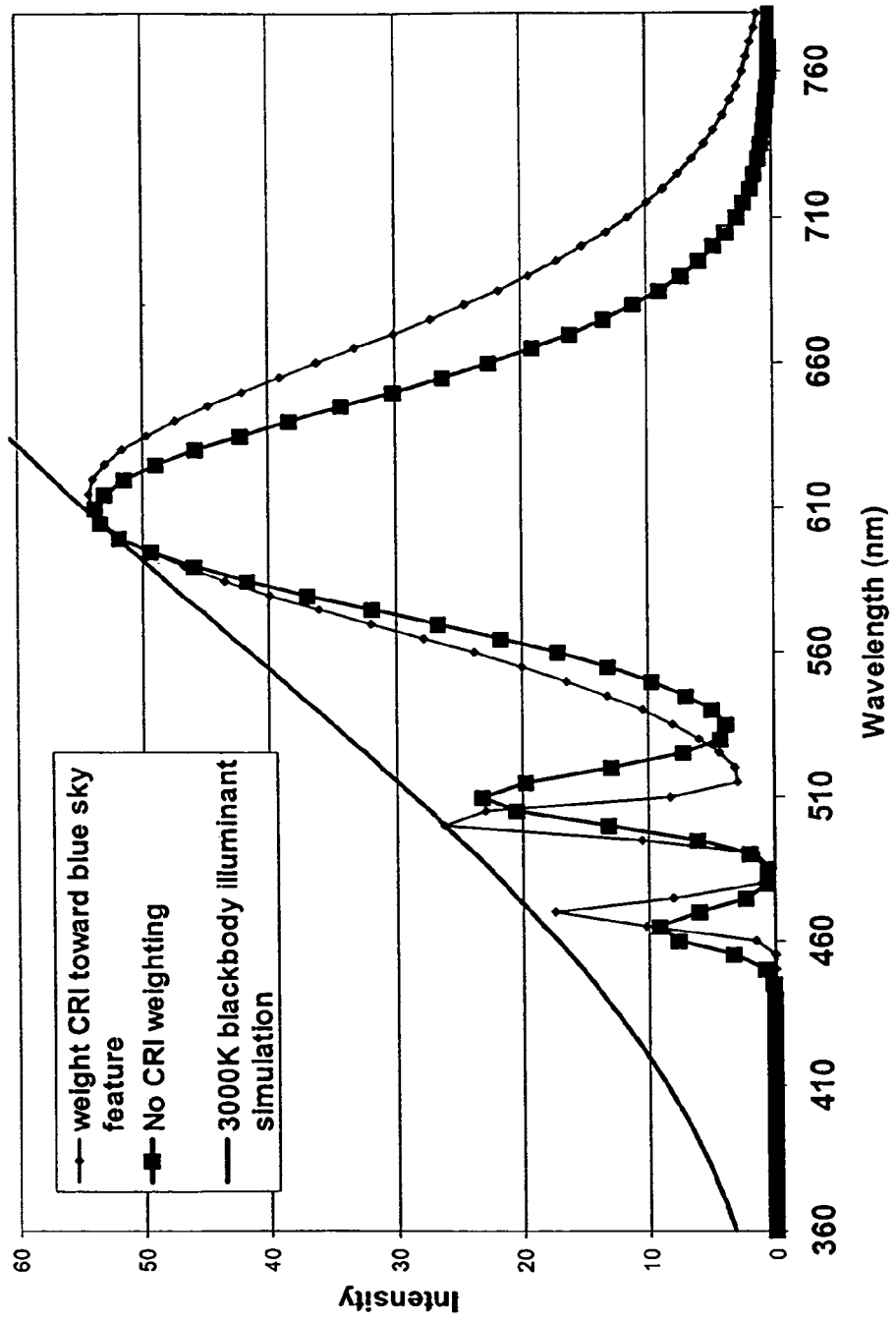
FIG. 21 illustrates representative customized spectral profiles for filter designs in accordance with embodiments of the present disclosure.

Note that it may well turn out that perhaps blue renderings might be inadequate for many patrons using this filter. Using the techniques of this disclosure, however, it is possible to weight the filter primarily toward the blue features of Clause Lorrain's Coast Scene to enhance the blue, as desired:

In this regard, FIG. 21 is a comparison of weighted and unweighted CRI optimizations of the blue sky feature of Claude Lorrain's Coast Scene with a Fight on a Boat. Note that optimizing toward the blue sky feature results in a different filter spectral profile. This figure illustrates, among other things, that filters may be customized even to areas or particular features within a particular object.

Comparison of the fit data is listed in Table 5:

TABLE 5

|  | No CRI weighting | CRI weighting |
| --- | --- | --- |
| CRI | 75.2 | 74.4 |
| CRI* | 87.3 | 96.2 |
| Efficiency | 58% | 64% |
| L/W Efficiency | 210% | 173% |
| Overall Efficiency | 122% | 110% |
| Power Reduction | 72% | 63% |

Figure 22:
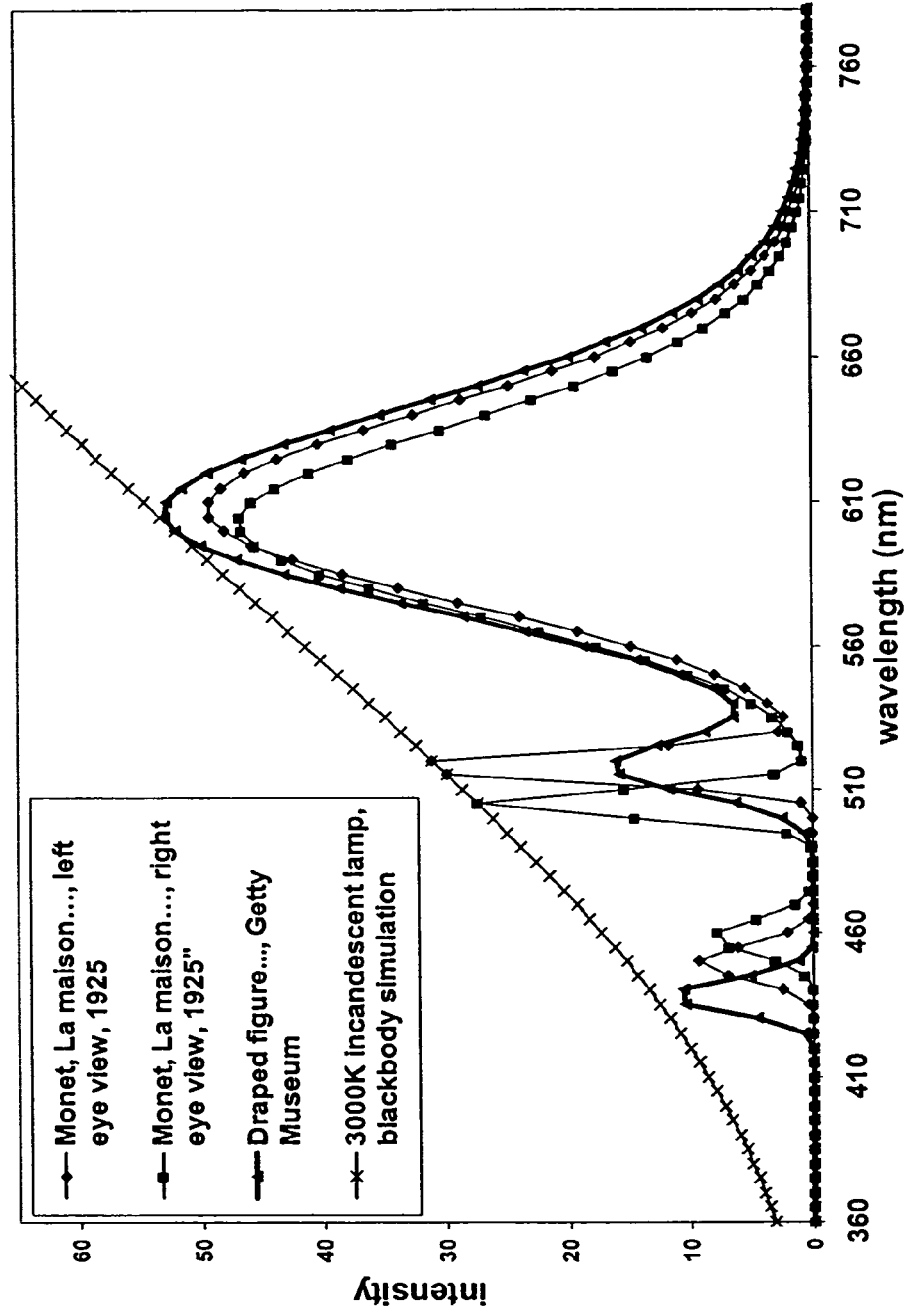
FIG. 22 illustrates representative customized spectral profiles for filter designs in accordance with embodiments of the present disclosure.

FIG. 22 shows three filters. Two Monet filters, and the filter for The Getty Museum watercolor, A Draped Figure Holding a Book. The filters are optimized using three Gaussian functions use reflection data from images of the paintings to optimize to a modified color rendering index, CRI*, tailored to each painting. As in previous candlelight filters, the spectral power distribution is held (by way of fixing the chromaticity) at that comparable to what would be expected from candlelight; hence, these are "candlelight" filters. The fact that the three filters are different illustrate the advantages in being able to optimize a filter to a given painting.

The parameters for these fits are listed in Table 6:

TABLE 6

|  | Monet Right Eye | Monet Left Eye | Draped Figure |
| --- | --- | --- | --- |
| CRI | 74.1 | 81.1 | 75.2 |
| CRI* | 87.4 | 83.9 | 99.9 |
| Efficiency | 50.1% | 52% | 58% |
| L/W Efficiency | 219% | 210% | 210% |
| Overall Efficiency | 110% | 110% | 122% |
| Power Reduction | 77% | 75% | 72% |

Note that CRI* is nearly 100 for the Draped Figure artwork, suggesting that this spectral profile would likely do a very good job at rendering this object - in fact, about well as the reference 3000K blackbody source being used.

What these examples emphasize, among other things, is that if the CRI* index is used as optimization parameters for the methodology of the present invention, one may readily generate customized spectral profiles (and filters) for particular works of art or objects. By weighting the CRI* optimizations differently (e.g., towards one or more features of the work of art, towards one or more features to be enhanced or emphasized, towards one or more damaged or faded features, towards one or more features to be de-emphasized or muted), one may further customize the spectral profiles and filters. Accordingly, one may render objects aesthetically and/or correct the rendering of objects. Because of the flexibility of the techniques of the present disclosure, any degree of customization is achievable simply by changing optimization parameters.

With regard to filter design, a lot may depend on setting priorities, and this is something that is typically discussed with museum conservators and involves getting the opinions of others. In particular, it may involve discussing high energy photons versus reducing all unnecessary photons. Intuition suggests that the high energy photons may be the main concern, but again, with the flexibility of the techniques herein, any number of different goals may be achieved, ranging from (but not limited to) generic filter to filters customized to particular works of arts.

With the benefit of the present disclosure, those of ordinary skill in the art will recognize that the techniques of this disclosure can be applied to, e.g., a vast number of lighting applications. For instance, in one embodiment, one can use these techniques and directly thin-film coat a light-emitting diode (LED) to modify the profile of the LED. LEDs have fairly-narrow spectral profiles confined to the visible. There is little infrared (IR) radiation, or the light is "cold." One can design an illuminant where the spectral profile of a broad band white LED is coated with an interference filter or use three different LEDs (blue, green, red) and selectively coat each so that the combined light from the LEDs is tailored as desired. An advantage to using LED illumination is that the IR is already mostly or completely removed, the emission is already confined to the visible, and power consumption is much lower.

With the benefit of the present disclosure, those having skill in the art will comprehend that techniques claimed herein and described above may be modified and applied to a number of additional, different applications, achieving the same or a similar result. The claims attached hereto cover all such modifications that fall within the scope and spirit of this disclosure.

The invention claimed is:

1. A method for generating a customized spectral profile, comprising:
   generating a trial source spectrum;
   determining an uncorrected lamp source spectrum;
   calculating one or more optical indices using the trial source spectrum or the uncorrected lamp source spectrum; and
   optimizing with a computer one or more of the optical indices by varying the trial source spectrum to generate the customized spectral profile.

2. The method of claim 1, further comprising calculating a corrected lamp source spectrum using the uncorrected lamp source spectrum, and the optical indices being calculated using the trial source spectrum, the uncorrected lamp source spectrum, or the corrected lamp source spectrum.

3. The method of claim 1, the optical indices comprising one or more of chromaticity, filter efficiency, lumens per watt efficiency, overall filter efficiency, watt reduction criteria, color rendering index, and modified color rendering index.

4. The method of claim 3, one or more of the optical indices corresponding to a specific object to be illuminated.

5. The method of claim 4, the specific object comprising a work of art.

6. The method of claim 1, the optimizing comprising varying the trial source spectrum by changing one or more parameters of contributing functions of the trial source spectrum or changing individual values of the trial source spectrum at different wavelengths.

7. The method of claim 1, the customized spectral profile comprising a spectral profile for protecting an object from photodamage.

8. The method of claim 7, the spectral profile rendering only photometric light.

9. The method of claim 7, the object comprising a work of art.

10. The method of claim 1, the customized spectral profile comprising a spectral profile for aesthetically rendering an object.

11. The method of claim 10, the spectral profile comprising a candlelight profile for rendering the object as if illuminated by candlelight.

12. The method of claim 10, the spectral profile comprising a torchlight profile for rendering the object as if illuminated by torchlight.

13. The method of claim 10, the spectral profile comprising a fluorescent profile for rendering the object as if illuminated by fluorescent lighting.

14. The method of claim 10, the spectral profile comprising an incandescent profile for rendering the object as if illuminated by an incandescent light.

15. The method of claim 10, the spectral profile comprising a halogen profile for rendering the object as if illuminated by halogen-based lighting.

16. The method of claim 10, the spectral profile comprising an oil lamp profile for rendering the object as if illuminated by an oil lamp.

17. The method of claim 10, the spectral profile comprising a daylight profile for rendering the object as if illuminated by sunlight.

18. The method of claim 10, the spectral profile comprising a roomlight profile for rendering the object as if illuminated by sunlight or candlelight scattered in a room.

19. The method of claim 10, the spectral profile comprising a gas light profile for rendering the object as if illuminated by a gas light.

20. The method of claim 10, the spectral profile comprising a lime light profile for rendering the object as if illuminated by a lime light.

21. The method of claim 10, the spectral profile comprising a mantle-light profile for rendering the object as if illuminated by a Welsbach mantle.

22. The method of claim 10, the spectral profile comprising an emphasis profile for emphasizing one or more colors of the object.

23. The method of claim 1, the customized spectral profile comprising a spectral profile for correcting the rendering an object.

24. The method of claim 23, the spectral profile comprising a profile for correcting the rendering of the object for an eye experiencing loss of vision with respect to one or more colors.

25. A method for generating an optical filter, comprising generating an optical filter having a customized spectral profile, the customized spectral profile being generated by optimizing with a computer one or more optical indices by varying a trial source spectrum, and the optical indices being calculated using the trial source spectrum or an uncorrected lamp source spectrum.

* * * * *

UNITED STATES PATENT AND TRADEMARK OFFICE
CERTIFICATE OF CORRECTION

| | | |
|---|---|---|
| PATENT NO. | : 7,663,739 B2 | Page 1 of 1 |
| APPLICATION NO. | : 10/688200 | |
| DATED | : February 16, 2010 | |
| INVENTOR(S) | : Carl W. Dirk | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1826 days.

Signed and Sealed this

Thirtieth Day of November, 2010

David J. Kappos
*Director of the United States Patent and Trademark Office*